(12) United States Patent
Tarui

(10) Patent No.: US 9,391,550 B2
(45) Date of Patent: Jul. 12, 2016

(54) SHIFT POSITION SWITCHING CONTROLLER

(71) Applicant: DENSO CORPORATION, Kariya, Aichi-pref (JP)

(72) Inventor: Jun Tarui, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/722,676

(22) Filed: May 27, 2015

(65) Prior Publication Data

US 2015/0349684 A1    Dec. 3, 2015

(30) Foreign Application Priority Data

May 28, 2014 (JP) ................... 2014-109758

(51) Int. Cl.
  *H02K 29/10* (2006.01)
  *H02P 6/16* (2016.01)
(52) U.S. Cl.
  CPC ........................ *H02P 6/16* (2013.01)
(58) Field of Classification Search
  CPC ................... H02K 29/10; H02P 6/16
  USPC ............ 318/400.01, 400.14, 400.23, 400.24,
    318/400.25, 400.4, 400.15, 400.37, 400.38,
    318/400.39, 599, 652, 653, 661, 686, 687,
    318/685, 689, 47, 700, 701, 705, 715, 720,
    318/721, 727, 746, 747, 779, 799, 800, 801,
    318/823, 244, 430, 432, 437; 123/406.62,
    123/406.63; 307/419; 340/11.1; 341/143;
    345/160, 165
  See application file for complete search history.

(56) References Cited

U.S. PATENT DOCUMENTS

| 4,914,437 | A * | 4/1990 | Kibrick | H03M 1/308 250/231.18 |
| 8,575,876 | B2 * | 11/2013 | Inoue | G01D 5/3473 318/400.4 |
| 8,872,511 | B2 * | 10/2014 | Manabe | G01D 5/24495 324/207.25 |
| 2004/0008002 | A1 * | 1/2004 | Kamio | G05B 19/4062 318/701 |
| 2005/0156550 | A1 | 7/2005 | Kamio et al. | |
| 2006/0108966 | A1 | 5/2006 | Kamio et al. | |
| 2010/0007689 | A1 | 1/2010 | Hagiwara | |

FOREIGN PATENT DOCUMENTS

| JP | H01-239415 | 9/1989 |
| JP | 2012-095407 | 5/2012 |
| JP | 2012-095846 | 5/2012 |
| JP | 2012-170213 | 9/2012 |

* cited by examiner

*Primary Examiner* — Antony M Paul
(74) *Attorney, Agent, or Firm* — Nixon & Vanderhye PC

(57) ABSTRACT

A motor control system controls a rotation drive of a motor by serially switching a power supply phase of the motor based on a count value of an output signal from an encoder and prevents a temporary noise from causing an abnormal rotation of such a motor. A microcomputer determines that one of an A phase signal or a B phase signal is a noise when the two signals are input at substantially at the same timing and one of the two signals has a shorter time interval from a previous input signal. Thus, a temporary noise is prevented from corrupting normal operation between the encoder count, the rotation position of the motor, and the power supply phase.

5 Claims, 18 Drawing Sheets

SHIFT POSITION SWITCHING CONTROLLER

CROSS REFERENCE TO RELATED APPLICATION

The present application is based on and claims the benefit of priority of Japanese Patent Application No. 2014-109758, filed on May 28, 2014, the disclosure of which is incorporated herein by reference.

TECHNICAL FIELD

The present disclosure generally relates to a shift position switching controller for switching shift positions with a motor.

BACKGROUND INFORMATION

In recent years, mechanical drive systems in vehicles, are gradually being replaced by electrical drive-by-wire systems, in which the components are driven by electric motors for improved space efficiency, assemblability, controllability, and the like. One example of such replacement may be found in transmission shift position switching mechanisms.

In such a system, for example, as disclosed in a patent document 1 (i.e., Japanese patent No. 3886042), an encoder that is synchronized with a rotation of the motor outputs a pulse signal at every given angle of the motor, and an output value of the encoder is used to detect a rotation position of the motor.

In the patent document 1, the power supply phase of the motor is serially switched to rotate the motor to a target rotation position corresponding to a target shift position based on the encoder count (i.e., information of the rotation position of the motor), which is achieved by a feedback control of the rotation drive of the motor.

Further, during the feedback control, when an interval of two A phase signals or an interval of two B phase signals increases to be equal to or greater than an abnormality determination value, or when a difference between an A phase encoder count and a B phase encoder count increases to be equal to or greater than an abnormality determination value, it is determined that an abnormality is caused in the feedback control of the system, and the system switches the feedback control to an open-loop control.

However, in patent document 1, a one-time or temporary noise may be erroneously recognized as an output signal from the encoder. Further, a matching between the encoder count, the rotation position of the motor, and the power supply phase may be broken, which may result in a failure in the motor rotation control, in which a rotation drive of the motor is performed by serially switching the power supply phase based on the encoder count.

SUMMARY

It is an object of the present disclosure to provide a shift position switching controller that prevents a failure of the motor rotation control of the motor due to temporary noise.

In an aspect of the present disclosure, the shift position switching controller includes a shift-position switcher switching shift positions by a drive power of a motor, an encoder outputting an A phase signal and a B phase signal in synchronization with a rotation of the motor, the A phase signal and the B phase signal interposed by a preset phase difference, and a controller controlling a rotation drive of the motor by sequentially switching a power supply phase of the motor based on a count value of the output signal from the encoder. When the A phase signal and the B phase signal are input at a time interval that is shorter than a preset length, the A phase signal or the B phase signal having a shorter time interval relative to a previous input signal is determined by the controller as being noise.

If both the A phase signal and the B phase signal are normal, the A phase signal and the B phase signal should have a preset phase difference. Therefore, when the A phase signal and the B phase signal are input within a certain time interval (i.e., when the A phase signal and the B phase signal are input almost simultaneously), one of the A phase signal and the B phase signals is considered as a noise, that is, the A or B phase signal having an interval shorter than a normal interval may be considered as noise.

Therefore, when the A phase signal and the B phase signal are input at a shorter-than-normal time interval, by determining one of the A or B phase signals having a shorter interval to the previous input signal as a noise, the noise is detected with sufficient accuracy and is not counted as the encoder count. In such manner, one-time noise or temporary noise is prevented from corrupting the matching relationship between the encoder count, the rotation position of the motor, and the power supply phase. That is, the motor rotation control for performing the rotation drive of the motor may be continued by serially switching the power supply phase based on the encoder count. Thus, a failure of the motor rotation control due to one-time noise is prevented.

In another aspect of the present disclosure, the controller may be configured to determine whether a current input signal is a valid signal based on a comparison of the current input signal with a previous input signal, and, when the controller determines that the current input signal is not a valid signal, the controller may determine that the current input signal is a noise.

If both of the A phase signal and the B phase signal are normal, the A phase signal and the B phase signal should be input in a given order. Therefore, by comparing the current input signal with the previous input signal whether the current input signal is a valid signal is determinable. Further, when it is determined that the current input signal is not a valid signal, by determining that the current input signal is a noise, a noise is detected with sufficient accuracy and is not counted as the encoder count. In such manner, one-time noise or temporary noise is prevented from corrupting the matching relationship between the encoder count, the rotation position of the motor, and the power supply phase. That is, the motor rotation control for performing the rotation drive of the motor may be continued by serially switching the power supply phase based on the encoder count. Thus, a failure of the motor rotation control due to one-time noise is prevented.

In yet another aspect of the present disclosure, the shift position switching controller includes a shift-position switcher switching shift positions by a drive power of a motor, an encoder outputting a pulse signal in synchronization with a rotation of the motor, and a controller performing a feedback control of a rotation drive of the motor to drive the motor to a target rotation position corresponding to a target shift-position, by serially switching a power supply phase of the motor based on an encoder count representing a count value of the output signals from the encoder.

The controller switches to an open-loop control in which the power supply phase is serially switched without receiving feedback of information regarding the encoder count when the encoder count changes abnormally during the feedback control, performs a relationship determination determining whether a relationship between a number of switchings of the power supply phase and an amount of change of the encoder count is normal during a rotation drive period during which the motor is driven to the target rotation position by the open-loop control, and re-learns a matching relationship between the encoder count and the power supply phase when the relationship determination indicates that the relationship is normal.

While performing the feedback control, if the matching relationship between the encoder count, the rotation position of the motor and the power supply phase is broken which results in a non-normal change of the encoder count, the feedback control is switched to the open-loop control. In such manner, the rotation position of the motor is matched to one of the multiple phases, i.e., to establish a matching power supply phase of the motor, for the rotation drive of the motor. In such an open-loop control, the motor is driven to the target rotation position, and, while driving the motor to such a target rotation position, whether the relationship between a number of switchings of the power supply phase and an amount of change of the encoder count is normal or not is determined.

Then, if the determination result of the relationship indicates that the relationship between the encoder count and the power supply phase is normal, the relationship between the encoder count and the power supply phase is re-learned. In such manner, while driving the motor to the target rotation position in the open-loop control, the relationship between the encoder count and the power supply phase is re-learned. Therefore, the motor rotation control, in which the rotation drive of the motor is performed by the serial switching of the power supply phase based on the encoder count, is resumable, i.e., recovering to a normal operation.

Further, the controller may also be configured to switch to the open-loop control in which the power supply phase is serially switched receiving feedback of information regarding the encoder count when the encoder count does not normally changes during the feedback control, and the controller performs a relationship determination determining whether a relationship between a number of switchings of the power supply phase and an amount of change of the encoder count is normal during a minute rotation drive period that drives the motor to stay within a current shift-position, the minute rotation drive period being a period after a main rotation drive for driving the motor to the target rotation position by the open-loop control, and the controller re-learns a matching relationship between the encoder count and the power supply phase when the relationship determination indicates that the relationship is normal.

While performing the feedback control, if the matching relationship between the encoder count, the rotation position of the motor and the power supply phase is broken which results in a non-normal change of the encoder count, the feedback control is switched to the open-loop control. In such manner, the rotation position of the motor is matched to one of the multiple phases, i.e., to establish a matching power supply phase of the motor, for the rotation drive of the motor. In such an open-loop control, the motor is driven to the target rotation position, then the motor is further driven for a small amount, i.e., to stay within a current (i.e., target) shift-position, and, while driving the motor for such a small mount, i.e., during the minute rotation drive period, whether the relationship between a number of switchings of the power supply phase and an amount of change of the encoder count is normal or not is determined.

Then, if the determination result of the relationship indicates that the relationship between the encoder count and the power supply phase is normal, the relationship between the encoder count and the power supply phase is re-learned. In such manner, after driving the motor to the target rotation position in the open-loop control (i.e., during the minute rotation drive period), the relationship between the encoder count and the power supply phase is re-learned. Therefore, the motor rotation control, in which the rotation drive of the motor is performed by the serial switching of the power supply phase based on the encoder count, is resumable, i.e., recovers to a normal operation.

BRIEF DESCRIPTION OF THE FIGURES

Objects, features, and advantages of the present disclosure will become more apparent from the following detailed description made with reference to the accompanying figures, in which.

DETAILED DESCRIPTION

Embodiments for practically implementing the present disclosure are described hereafter in details.

First Embodiment

The first embodiment of the present disclosure is described based on FIGS. 1 to 8.

Figure 1:
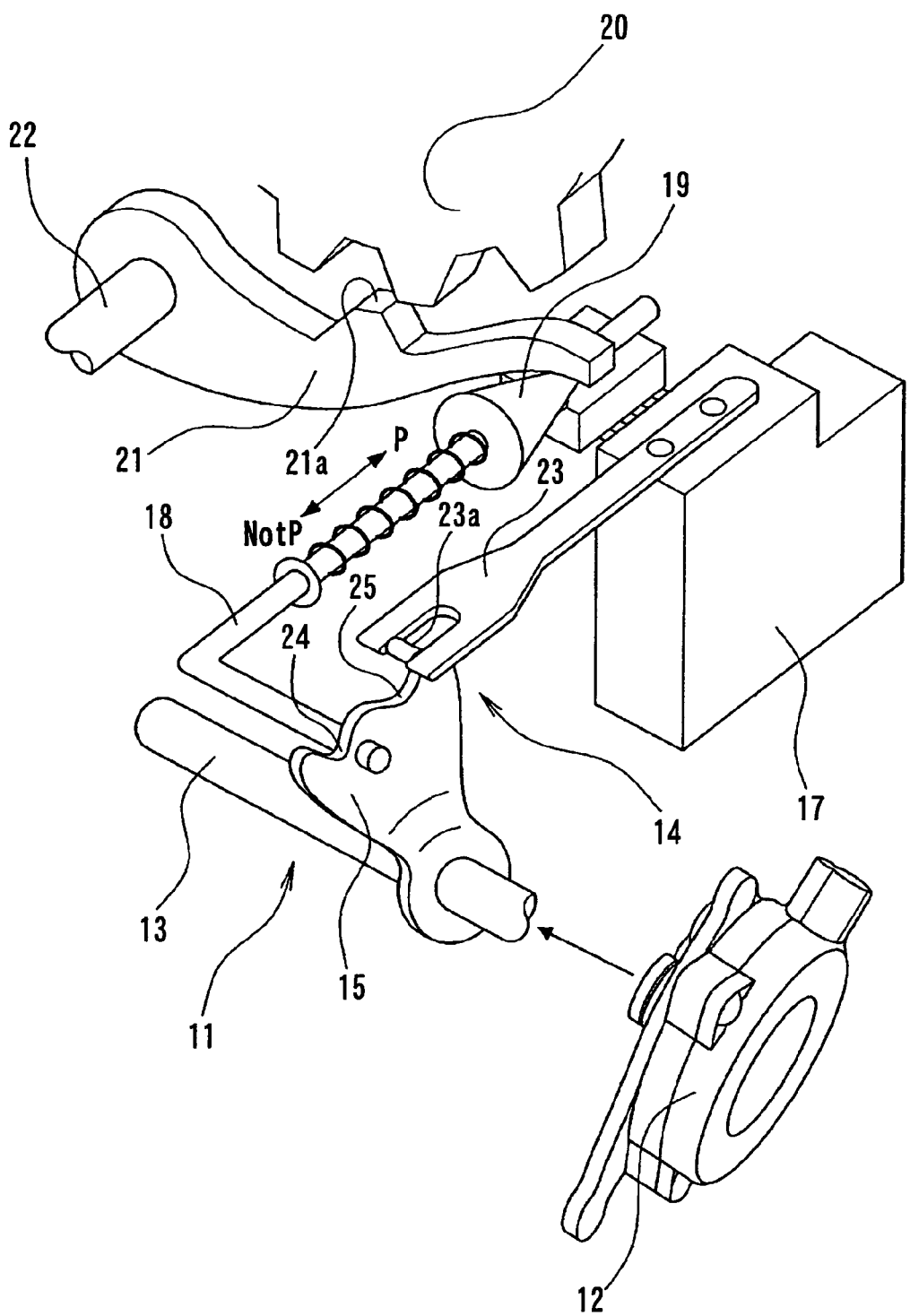
FIG. 1 is a perspective view of a shift position switching mechanism of the present disclosure.
Figure 2:
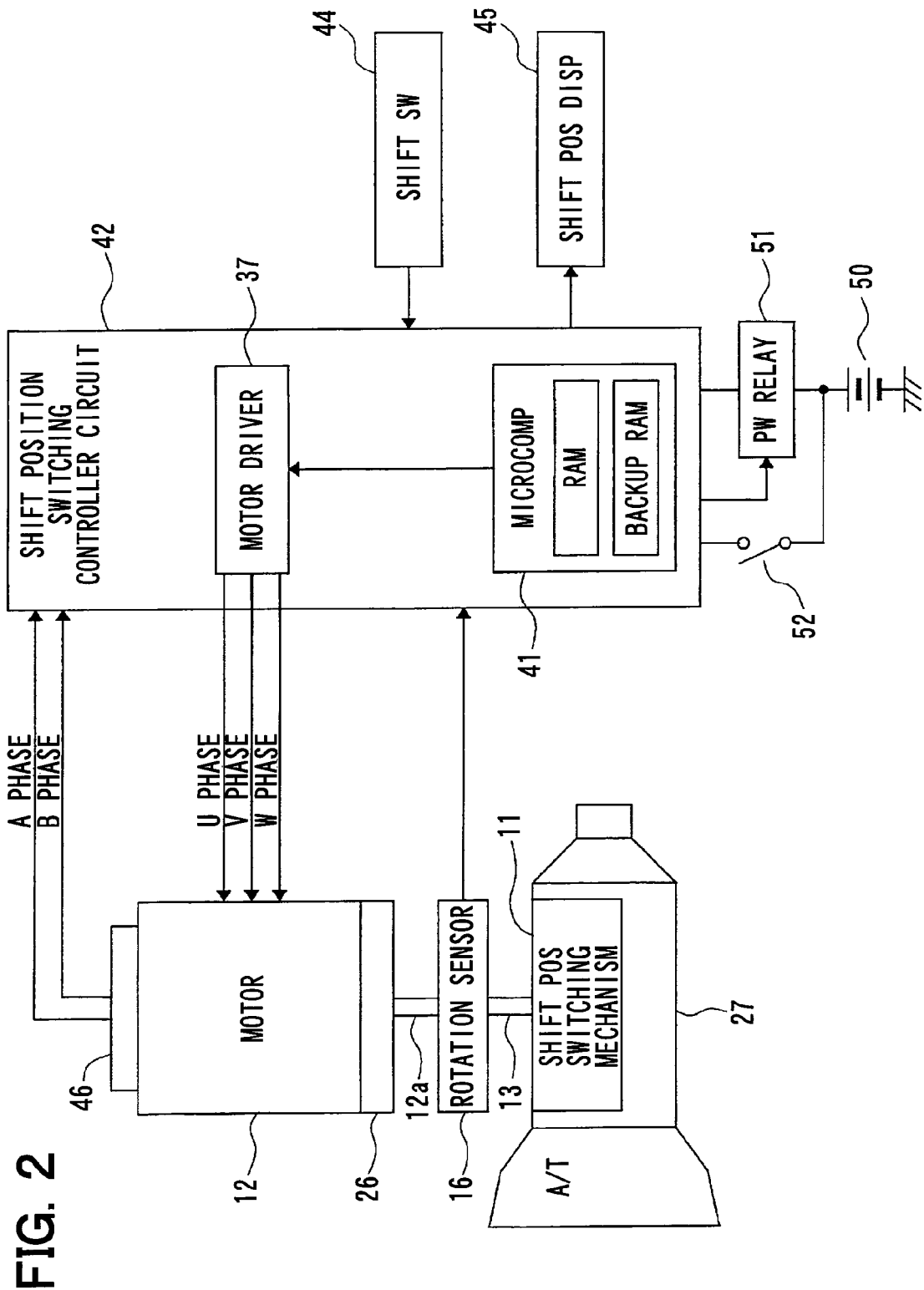
FIG. 2 is a block diagram of a shift position switching controller.

First, the composition of a shift position switching controller is explained based on FIGS. 1 and 2.

As shown in FIG. 1, a shift position switching mechanism 11 is a shift position switching mechanism of 2 position types which switches the shift position of an automatic transmission 27 (refer to FIG. 2) between P position (i.e., Parking position) and a Not-P position. A motor 12 used as a source of a drive power of this shift position switching mechanism 11 is constituted as a switched reluctance motor, for example. The motor 12 has a built-in deceleration mechanism 26 (refer to FIG. 2), and a manual shaft 13 of the shift position switching mechanism 11 is connected to an output shaft 12a of the deceleration mechanism 26 (refer to FIG. 2). A detent lever 15 is fixed onto the manual shaft 13.

A manual valve (not shown) connected to the detent lever 15 moves linearly, i.e., performs a translational movement, according to the rotation of the lever 15, and a shift position of the switching mechanism 11 is switched by switching a hydraulic circuit (not shown) inside the automatic transmission 27 with this manual valve.

A parking rod 18 of L shape is fixed onto the detent lever 15, and a cone shape body 19 disposed at a tip point of the parking rod 18 is in contact with a locking lever 21. The locking lever 21 moves up and down about a shaft 22 according to the position of the cone shape body 19, for locking and releasing a lock of a parking gear 20. The parking gear 20 is disposed on an output shaft of the automatic transmission 27, and when the parking gear 20 is locked with the locking lever 21, drive wheel of the vehicle is held in a locked state (i.e., in a parking state).

On the other hand, a detent spring 23 for holding the detent lever 15 in each of two positions (i.e., the P position and the Not-P position) is fixed onto a support base 17, and a P position holding concave 24 and a Not-P position holding concave 25 are formed on the detent lever 15. When an engagement part 23a provided at the tip of the detent spring 23 fits into the P position holding concave 24 of the detent lever 15, the detent lever 15 is held in the P position. When the engagement part 23a of the detent spring 23 fits into the Not-P position holding concave 25 of the detent lever 15, the detent lever 15 is held in the Not-P position. Having the above-described components, i.e., the detent lever 15, the detent spring 23 and the like, a detent mechanism 14 engagingly holds a rotary position of the detent lever 15 in each of the shift positions, i.e., the shift position switching mechanism 11 is held in each of the shift positions.

In the P position, the parking rod 18 moves in one direction, approaching the locking lever 21, and a thick portion of the cone shape body 19 pushes up the locking lever 21, and a convex part 21a of the locking lever 21 engages the parking gear 20 for holding the parking gear 20 in a locked state. In such manner, the output shaft of the automatic transmission 27 (i.e., a drive wheel) is held in a locked state (i.e., in a parking state).

On the other hand, in the Not-P position, the parking rod 18 moves away from the locking lever 21, and the thick portion of the cone shape body 19 is pulled out from the locking lever 21 for releasing the parking gear 20 from the locked state, thereby holding the output shaft of the automatic transmission 27 in a rotatable state, i.e., in a travelable state.

As shown in FIG. 2, a rotation sensor 16 which detects a rotation angle (i.e., a rotation position) of the manual shaft 13 is formed in the manual shaft 13 of the shift position switching mechanism 11. The rotation sensor 16 is constituted by a device which outputs a voltage according to the rotation angle of the manual shaft 13 (e.g., potentiometer), for an assurance/confirmation whether an actual shift position is in the P position or in the Not-P position based on the output voltage.

As shown in FIG. 2, an encoder 46 for detecting the rotation angle (i.e., the rotation position) of a rotor is disposed on the motor 12. The encoder 46 is constituted as a rotary encoder of the magnetic type, for example, and it is configured so that a pulse signal of an A phase and of a B phase having a preset phase difference is output in in synchronization with a rotation of the rotor of the motor 12 at every given angle.

A microcomputer 41 (i.e., a controller) of a position switching control circuit 42 counts both edges, i.e., a rising edge and a falling edge, of the A phase signal and the B phase signal which are outputted from the encoder 46, and drives, i.e., rotates, the motor 12 by switching a power supply phase of the motor 12 in a preset order by using a motor driver 37 according to the counted value, i.e., according to an encoder count, hereafter. In such a case, a combination of winding wires of three phases (i.e., U/V/W phases) and the motor driver 37 may be provided in two systems, for a redundancy and a failsafe configuration, i.e., for a continuation of the rotation of the motor 12 even when one system fails in a breakdown.

During the rotation of the motor 12, based on an order of generation of the A phase signal and the B phase signal, a rotation direction of the motor 12 is determined, and, during a forward rotation of the motor 12 (i.e., a rotation from the P position to the Not-P position), the encoder count is counted down, and, during a reverse rotation of the motor 12 (i.e., a rotation from the Not-P position to the P position), the encoder count is counted up.

In such manner, whichever the rotation direction of the motor 12, the encoder count and the rotation angle of the motor 12 match, thereby (i) enabling a detection of the rotation position of motor 12 based on the encoder count and (ii) enabling a rotation drive of the motor 12 according to the switching of the power supply switched to the winding wire of a corresponding phase of the detected rotation position.

A signal indicative of an operation position of the shift lever detected with a shift switch 44 is input to the position switching control circuit 42.

By an input of such a signal, the microcomputer 41 of the position switching control circuit 42 switches a target position according to a driver's operation of the shift lever or the like, and the motor 12 is driven according to the target position for a switching of the shift positions, and the actual shift position after such a switching is displayed on a position display screen 45 which is provided on an instrument panel (not illustrated).

A power supply voltage is supplied to the position switching control circuit 42 via a power relay 51 from a battery 50 (i.e., from a power supply) in the vehicle. ON and OFF of the power relay 51 is switched by manually operating ON and OFF of an IG switch 52 (i.e., an ignition switch) which serves as a power switch. When the IG switch 52 is turned ON, the power relay 51 is turned ON and the power supply voltage is supplied to the position switching control circuit 42, and, when the IG switch 52 is turned OFF, the power relay 51 is turned OFF and the power supply to the position switching control circuit 42 is intercepted (i.e., turned OFF).

In terms of turning OFF of the power supply, the encoder count memorized in a RAM of the microcomputer 41 is lost when the power supply for the position switching control circuit 42 is turned OFF. Therefore, the encoder count immediately after a power ON of the position switching control circuit 42 does not match the rotation position of the motor 12 (i.e., the power supply phase). Therefore, for the switching of the power supply phase according to the encoder count, the actual rotation position of the motor 12 has to be immediately matched to the encoder count after the power ON of the circuit 42, for the matching therebetween, i.e., for a corresponding relation between the encoder count and the power supply phase.

Thus, the microcomputer 41 performs an initial drive after a power ON of the power supply of the motor 12, for learning a matching relation between the power supply phase and the encoder count. In the initial drive, an open-loop control is performed for one cycle of the switching of the power supply phase of the motor 12 according to a certain time schedule, for finding a matching relation between the rotation position of the motor 12 and one of the power supply phases and for counting the edges of the A/B phase signals, thereby establishing/learning the matching of the encoder count, the rotation position of the motor 12 and the power supply phase at the end of the initial drive.

Further, the microcomputer 41 simply relies on an after-power-ON encoder count for detecting an after-power-ON rotation amount (i.e., a rotation angle) for the control of the motor 12, thereby making it necessary by itself to detect an absolute rotation position of the motor 12 in one way or other at some point after the power ON, for accurately controlling the motor 12 to rotate to the target rotation position.

Therefore, after the end of the initial drive, the microcomputer 41 rotates the motor 12 to an abutment position, defining a limit of rotation, i.e., movable range, of the shift position switching mechanism 11, and learns such an abutment position as a reference position, for controlling the rotation amount (i.e., the rotation angle) of the motor 12 with reference to an encoder count of such a reference position.

Once learning a reference position, the microcomputer 41 changes a target rotation position (i.e., a target count) according to the switching of the target shift position when the driver operates the shift lever for the switching thereof. Then, based on the encoder count, the microcomputer 41 performs a feedback control for rotating, by serially switching the power supply phases, the motor 12 to the target rotation position that corresponds to the target shift position, for the switching of the shift positions (i.e., for the switching of the positions of the shift position switching mechanism 11 to the position of the target shift position).

During the above-described control, one-time/temporary noise may be mistakenly recognized as the output signal (i.e., as the A phase signal or the B phase signal) of the encoder 46, which leads to an unmatching between the encoder count, the rotation position of the motor 12, and the power supply phase, the rotation drive of the motor 12 based on the serially-switched power supply phases according to the encoder count may be no longer normally performable.

Therefore, in the present embodiment, a noise determination routine in FIGS. 5 to 8, which is described later in detail, is executed by the microcomputer 41 of the position switching control circuit 42, for determining a noise. That is, when the A phase signal and the B phase signal are input with a time interval shorter than a preset time, one of the A or B phase signals having a shorter-than-preset-time interval relative to a previous input signal is determined as a noise.

If both the A phase signal and the B phase signal are normal, the A phase signal and the B phase signal should have a preset phase difference. Therefore, when the A phase signal and the B phase signal are input with the time interval shorter than a preset time (i.e., when the A phase signal and the B phase signal are input almost simultaneously), one of the A phase signal and the B phase signal is considered as a noise, which is input with the time interval that is shorter than a normal time interval (relative to the previous input signal).

Therefore, when the A phase signal and the B phase signal are input with the time interval shorter than a preset time, by determining that one of the A phase signal and the B phase signal with a time interval shorter than a preset time is a noise, a noise signal is accurately detected, preventing such a noise from being part of the encoder count.

Figure 3:
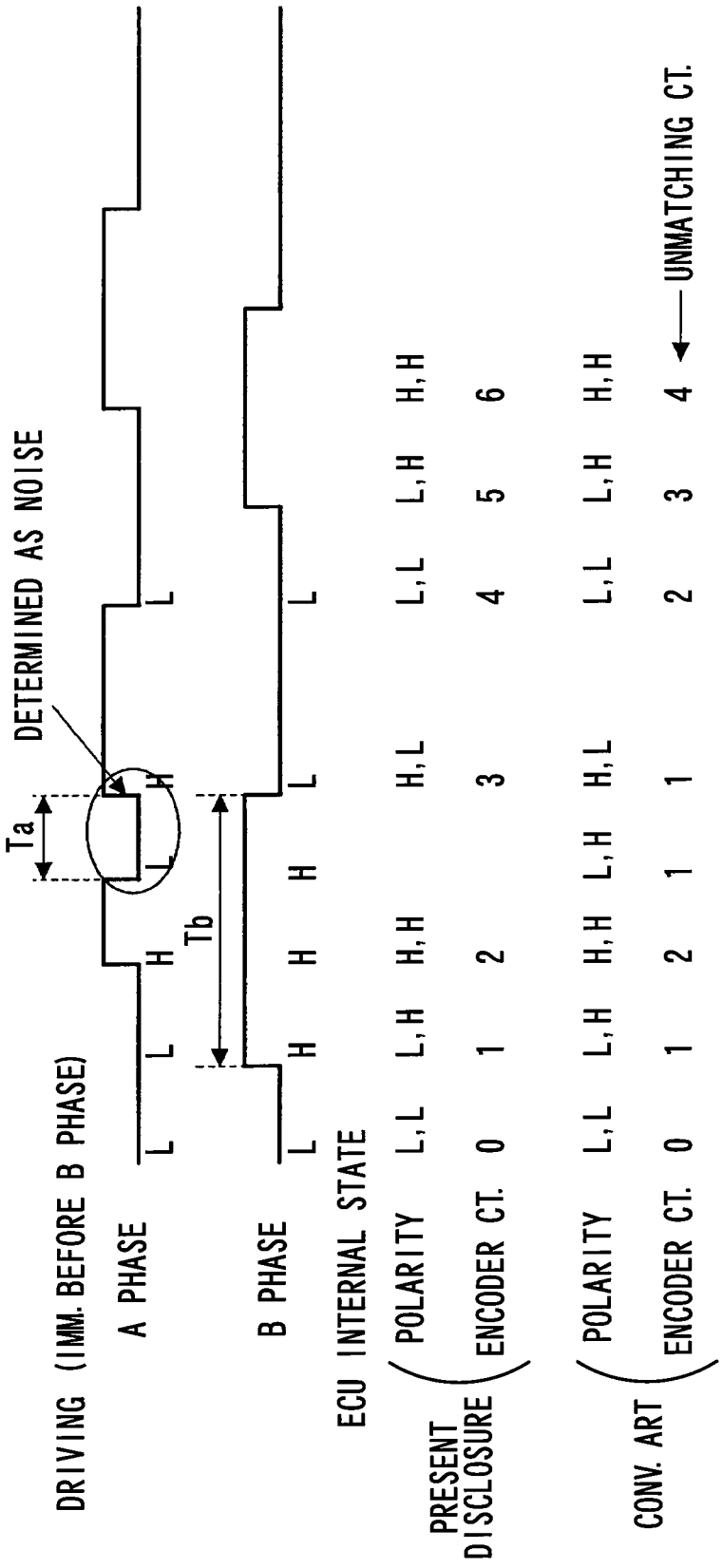
FIG. 3 is a time chart of a noise determination of the present disclosure.

More specifically, as shown in FIG. 3, when the rising edge of the A phase signal and the falling edge of the B phase signal are input almost simultaneously, a pulse width Ta of the current A phase signal (i.e., a time interval of the current rising edge and the previous falling edge) is compared with a pulse width Tb of the current B phase signal (i.e., a time interval of the current falling edge and the previous rising edge).

As a result, when the pulse width Ta of the current A phase signal is shorter than the pulse width Tb of the current B phase signal, the rising edge of the current A phase signal is determined as a noise, and is ignored (not included in the encoder count). In such case, the previous falling edge of the A phase signal is also ignored.

Figure 4:
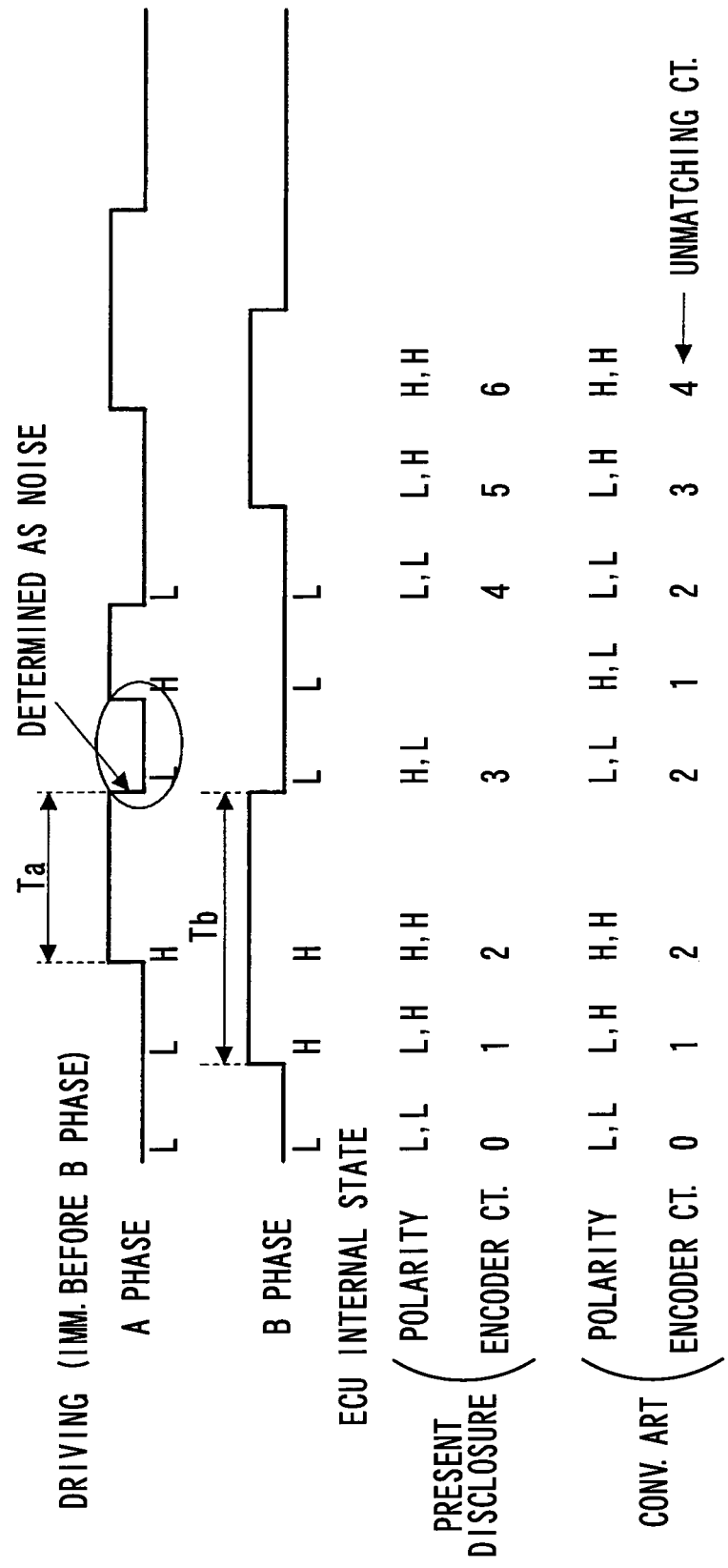
FIG. 4 is a time chart of another noise determination of the present disclosure.
Figure 5:
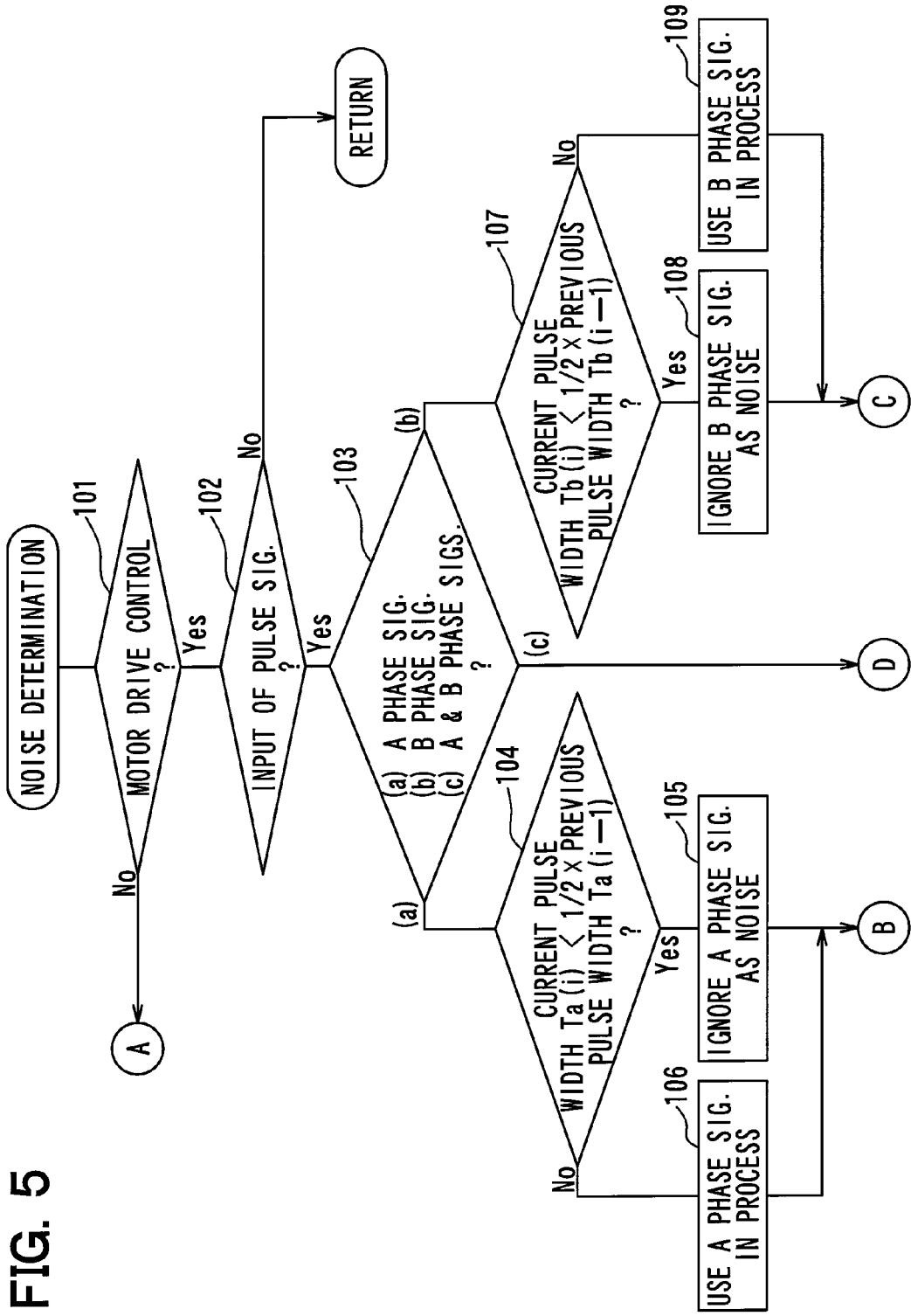
FIG. 5 is a flowchart of processes of a noise determination routine of the present disclosure.

Further, as shown in FIG. 4, when the falling edge of the A phase signal and the falling edge of the B phase signal are input almost simultaneously, a pulse width Ta of the current A phase signal (i.e., a time interval of the current falling edge and the previous rising edge) is compared with a pulse width Tb of the current B phase signal (i.e., a time interval of the current falling edge and the previous rising edge).

As a result, when the pulse width Ta of the current A phase signal is shorter than the pulse width Tb of the current B phase signal, the rising edge of the current A phase signal is determined as a noise, and is ignored. In such case, the previous falling edge of the A phase signal is also ignored.

In such manner, the unmatching of the encoder count, the rotation position of the motor 12, and the power supply phase due to the one-time/temporary noise is prevented, thereby enabling a continuation of the rotation drive of the motor 12 by serially switching the power supply phases based on the encoder count.

Hereafter, the contents of the noise determination routine of FIGS. 5 to 8 in the present embodiment, which is executed by the microcomputer 41 of the position switching control circuit 42, are described.

The noise determination routine shown of FIGS. 5 to 8 is repeatedly executed at a given cycle by the microcomputer 41 during a power ON period of the position switching control circuit 42. Once the routine is started, it is determined at Step 101 whether the motor rotation control is being performed.

When it is determined at Step 101 that the motor rotation control is being performed, proceeding to Step 102, and it is determined whether an edge (i.e., a rising edge or a falling edge) of a pulse signal is input.

The routine is finished without performing a process after Step 103, when it is determined that an edge of a pulse signal is not input at Step 102.

Then, when it is determined that an edge of a pulse signal is input at the above-mentioned Step 102, after proceeding to Step 103, one of the following items (a) to (c) is determined.

(a) An edge of the A phase signal is input.
(b) An edge of the B phase signal is input.
(c) An edge of the A phase signal and an edge of the B phase signal are input almost simultaneously.

Under the present circumstances, (c) whether an edge of the A phase signal and an edge of the B phase signal are input almost simultaneously is determined based on an examination whether an edge of the A phase signal and an edge of the B phase signal are input with a time interval shorter than a preset time (i.e., whether a time interval between an edge of the A phase signal and an edge of the B phase signal is shorter than a preset time or not).

At Step 103, when it is determined that (a) an edge of the A phase signal is input, proceeding to Step 104, and a pulse width Ta(i) of the current A phase signal (i.e., a time interval of the current edge and the previous edge) is extremely shorter than a pulse width Ta(i−1) of the previous signal (i.e., a time interval of the previous edge and the previous of previous edge). That is, for example, it is determined whether the pulse width Ta(i)<one half of the pulse width Ta(i−1) (i.e., Ta(i)<½×Ta(i−1)).

At Step 104, when it is determined that the pulse width Ta(i) of the A phase signal is extremely shorter than the pulse width Ta(i−1) (e.g., Ta(i)<½×Ta(i−1)), proceeding to Step 105, and the edge of the current A phase signal is determined as a noise, and is ignored (not included in the encoder count).

On the other hand, when it is determined that the pulse width Ta(i) of the A phase signal is not extremely shorter than to the pulse width Ta(i−1) at the above-mentioned Step 104 (e.g., Ta(i)≥½×Ta(i−1)), proceeding to Step 106, and it is determined that the edge of the current A phase signal is a normal one (i.e., is not a noise), and the edge is included in the encoder count.

When it is determined, at the above-mentioned Step 103, that (b) an edge of the B phase signal is input, proceeding to Step 107, and it is determined whether a pulse width Tb(i) of the current B phase signal (i.e., a time interval of the current edge and the previous edge) is extremely shorter than a pulse width Tb(i−1) (i.e., a time interval of the previous edge and the edge before previous) (i.e., Tb(i)<½×Tb(i−1)).

At Step 107, when it is determined that the pulse width Tb(i) of the current B phase signal is extremely shorter than the pulse width Tb(i−1) (e.g., Tb(i)<½×Tb(i−1)), proceeding to Step 108, and the edge of the B phase signal is determined as a noise, and is ignored.

On the other hand, when it is determined that the pulse width Tb(i) of the current B phase signal is not extremely shorter than the pulse width Tb(i−1) at the above-mentioned Step 107 (e.g., Tb(i)≥½×Tb(i−1)), proceeding to Step 109, and it is determined that the edge of the current B phase signal is a normal one (i.e., is not a noise), and the edge is included in the encoder count.

Figure 6:
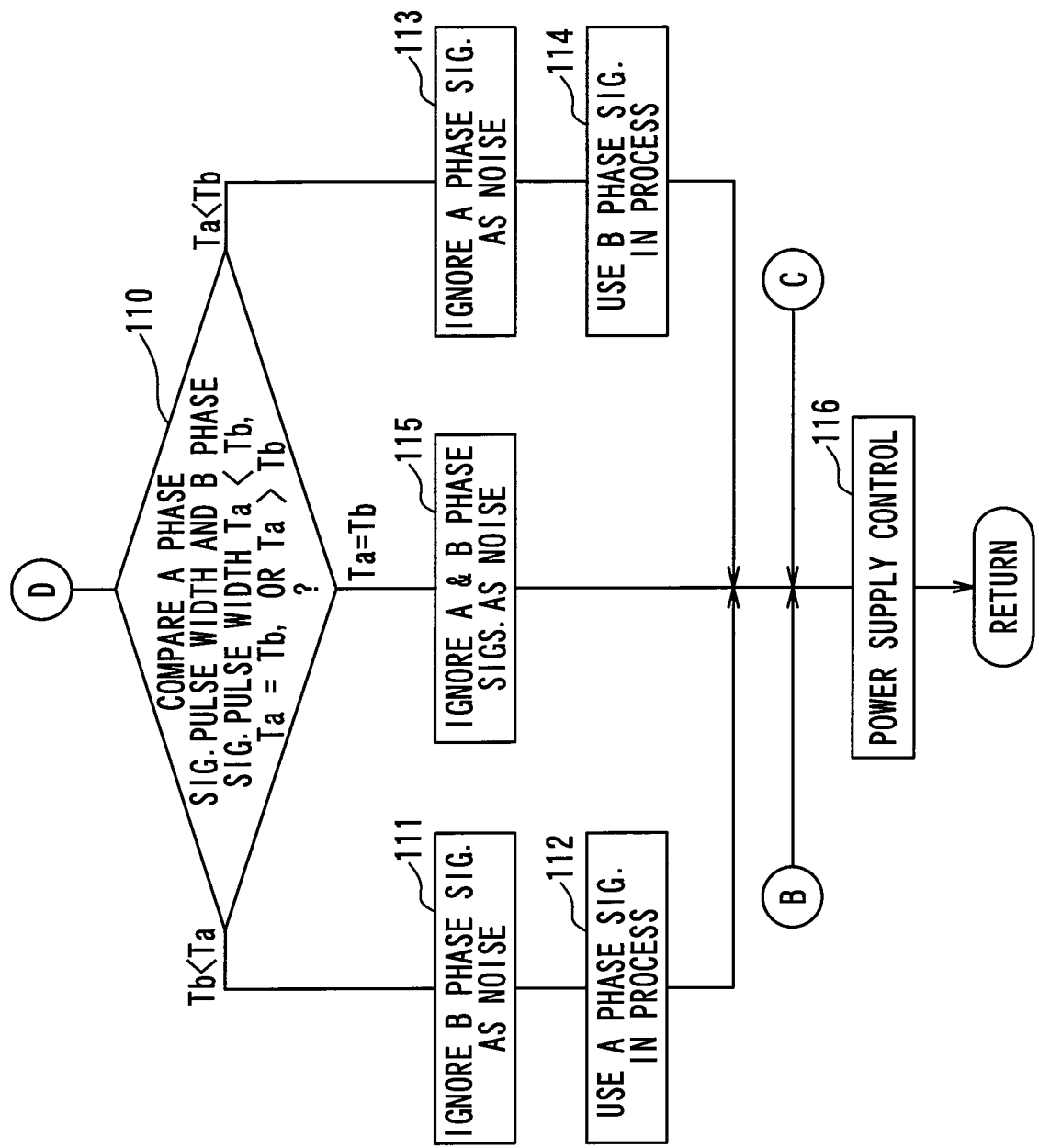
FIG. 6 is a flowchart of processes of the noise determination routine of the present disclosure (continuation from FIG. 5)

Further, when it is determined, at the above-mentioned Step 103, that (c) an edge of the A phase signal and an edge of the B phase signal are input almost simultaneously, proceeding to Step 110 of FIG. 6, and the pulse width Ta of the current A phase signal (i.e., a time interval of the current edge and the previous edge) is compared with the pulse width Tb of the B phase signal (i.e., a time interval of the current edge and the previous edge).

At Step 110, when it is determined that the pulse width Tb of the current B phase signal is shorter than the pulse width Ta of the current A phase signal (i.e., Tb<Ta), proceeding to Step 111, and the edge of the current B phase signal is determined as a noise, and is ignored.

Then, proceeding to Step 112, and you judge that the edge of the A phase signal is normal (it is not a noise), and make it reflected in data a process of the encoder count.

On the other hand, at the above-mentioned Step 110, when it is determined that the pulse width Ta of the current A phase signal is shorter than the pulse width Tb of the current B phase signal (i.e., Ta<Tb), proceeding to Step 113, and it is determined that the edge of the A phase signal is determined as a noise, and is ignored.

Then, proceeding to Step 114, and it is determined that the edge of the B phase signal is a normal one (i.e., is not a noise), and the edge is include in the encoder count.

Further, at the above-mentioned Step 110, when it is determined that the pulse width Ta of the current A phase signal is equal to the pulse width Tb of the current B phase signal (i.e., Ta=Tb), proceeding to Step 115, and it is determined that both of the edge of the current A phase signal and the edge of the current B phase signal are a noise, and are ignored.

Proceeding to Step 116 after determining whether the input pulse signal is a noise or not and excluding an influence of the noise at the above-mentioned Steps 102-115, a power supply control that switches the power supply phases based on the encoder count is performed.

Figure 7:
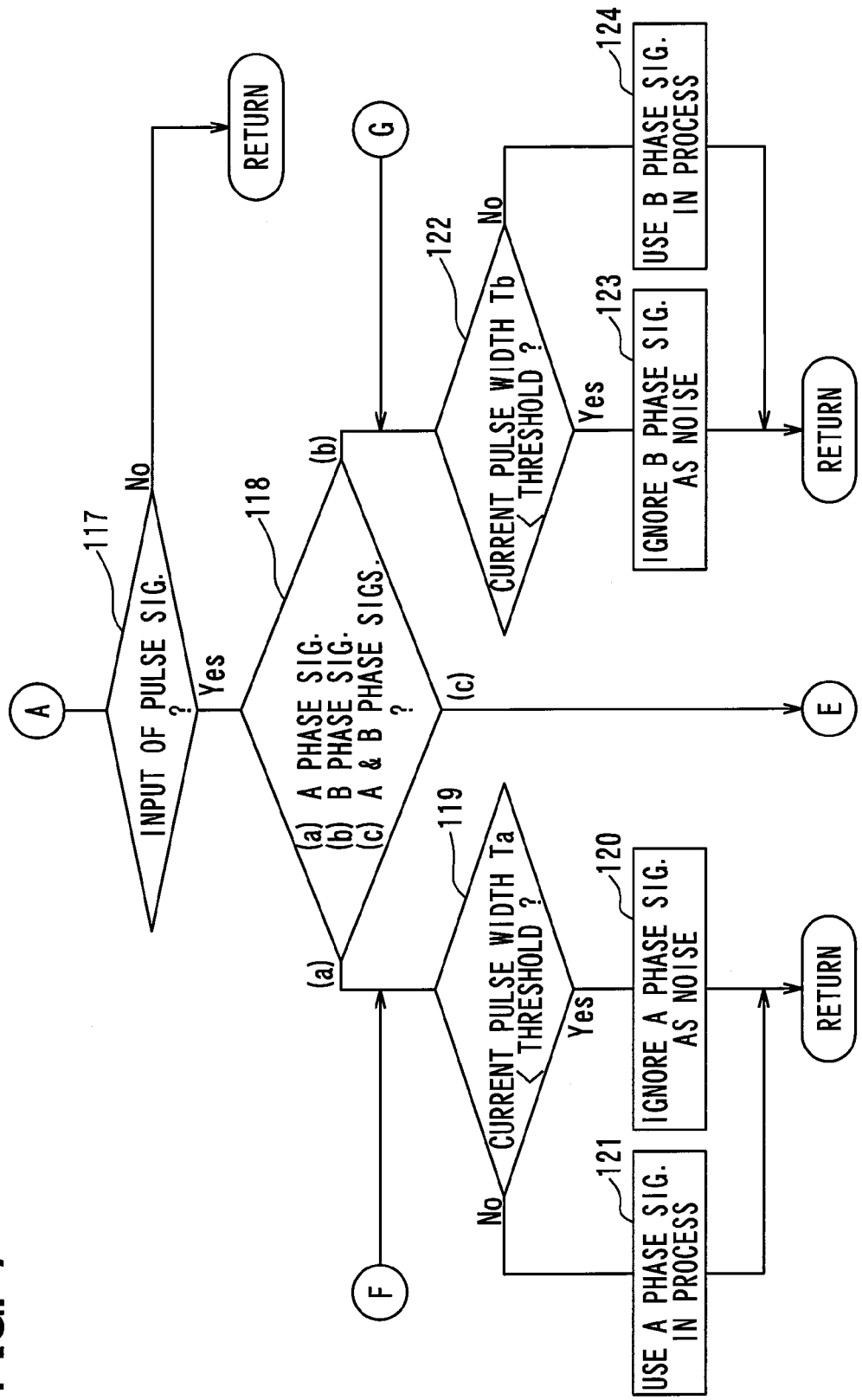
FIG. 7 is a flowchart of processes of the noise determination routine of the present disclosure (continuation from FIG. 5)

On the other hand, when it is determined, at the above-mentioned Step 101, that the motor rotation control is not being performed (i.e., it is during a stop time of the motor rotation control), proceeding to Step 117 of FIG. 7, and it is determined whether an edge of the pulse signal is input. When it is determined that an edge of the pulse signal is not input at Step 117, the routine is finished without performing processes after Step 118.

Then, once it is determined that an edge of the pulse signal is input at the above-mentioned Step 117 in the meantime, after proceeding to Step 118, one of the following items (a) to (c) is determined.

(a) An edge of the A phase signal is input.
(b) An edge of the B phase signal is input.
(c) An edge of the A phase signal and an edge of the B phase signal are input almost simultaneously.

At Step 118, when it is determined that (a) an edge of the A phase signal is input, proceeding to Step 119, and it is determined whether the pulse width Ta of the current A phase signal (i.e., a time interval of the current edge and the previous edge) is shorter than a determination value (i.e., a threshold). Here, the determination value may be set to a value such as a mechanical resonance cycle of a system, a resonance cycle of circuit characteristics, or to a value shorter than that, for example.

At Step 119, when it is determined that the pulse width Ta of the current A phase signal is shorter than the determination value, proceeding to Step 120, and the edge of the current A phase signal is determined as a noise, and is ignored.

On the other hand, when it is determined, at the above-mentioned Step 119, that the pulse width Ta of the current A phase signal is equal to or greater than the determination value, proceeding to Step 121, and it is determined that the edge of the current A phase signal is a normal one (i.e., is not a noise), and is included in the encoder count.

On the other hand, it is determined, at the above-mentioned Step 118, that (b) an edge of the B phase signal is input, proceeding to Step 122, and it is determined whether the pulse width Tb of the current B phase signal (i.e., a time interval of the current edge and the previous edge) is shorter than the determination value.

Here, the determination value may be set to a value such as a mechanical resonance cycle of a system, a resonance cycle of circuit characteristics, or to a value shorter than that, for example.

At Step 122, when it is determined that the pulse width Tb of the current B phase signal is shorter than the determination value, proceeding to Step 123, and the edge of the current B phase signal is determined as a noise, and is ignored.

On the other hand, when it is determined, at the above-mentioned Step 122, that the pulse width Tb of the B phase signal is equal to or greater than the determination value, proceeding to Step 124, and it is determined that the edge of the current B phase signal is a normal one (i.e., is not a noise), and is included in the encoder count.

Figure 8:
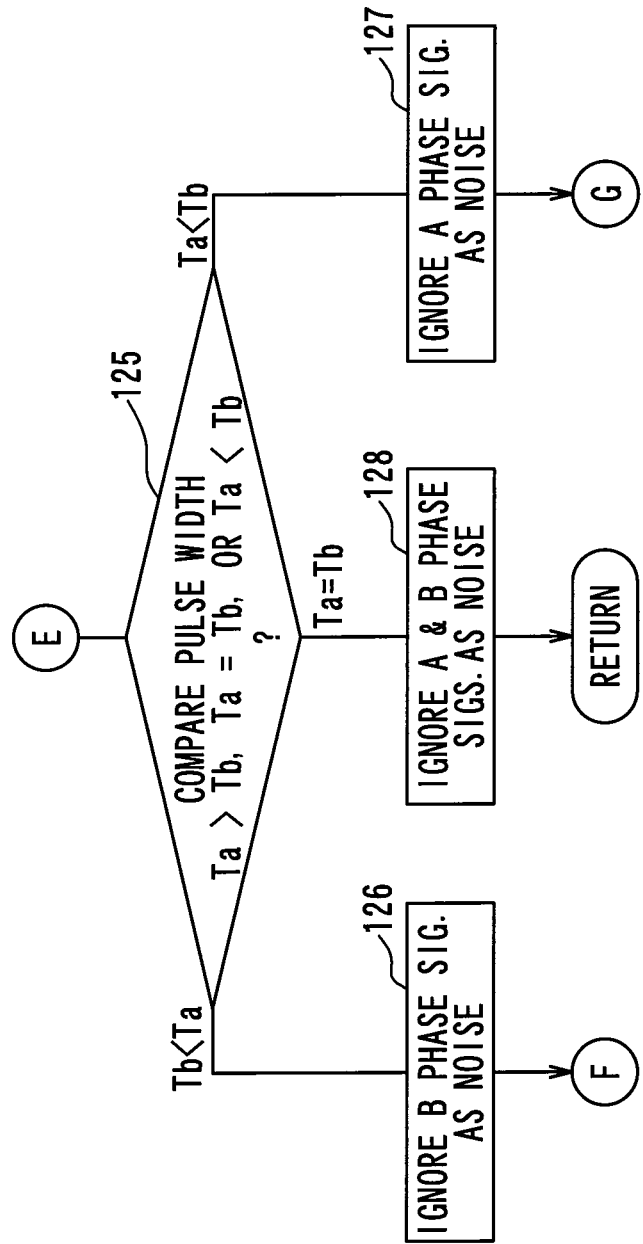
FIG. 8 is a flowchart of processes of the noise determination routine of the present disclosure (continuation from FIG. 5)

Further, when it is determined, at the above-mentioned Step 118, that © an edge of the A phase signal and an edge of the B phase signal are input almost simultaneously, proceeding to Step 125 of FIG. 8, and the pulse width Ta of the current A phase signal (i.e., a time interval of the current edge and the previous edge) is compared with the pulse width Tb of the B phase signal (i.e., a time interval of the current edge and the previous edge).

At Step 125, when it is determined that the pulse width Tb of the current B phase signal is shorter than the pulse width Ta of the current A phase signal (i.e., Tb<Ta), proceeding to Step 126, and the edge of the current B phase signal is determined as a noise, and is ignored.

Then, after proceeding to Step 119, it is determined whether the pulse width Ta of the current A phase signal is shorter than the determination value, and, when it is determined that the pulse width Ta of the current A phase signal is shorter than the determination value, proceeding to Step 120, and the edge of the current A phase signal is determined as a noise, and is ignored.

On the other hand, when it is determined, at the above-mentioned Step 119, that the pulse width Ta of the current A phase signal is beyond the determination value, proceeding to Step 121, and it is determined that the edge of the current A phase signal is a normal one, and is included in the encoder count.

On the other hand, at the above-mentioned Step 125, when it is determined that the pulse width Ta of the current A phase signal is shorter than the pulse width Tb of the current B phase signal (i.e., Ta<Tb), proceeding to Step 127, and it is determined that the edge of the current A phase signal is a noise, and is ignored.

Then, after proceeding to Step 122, it is determined whether the pulse width Tb of the current B phase signal is shorter than the determination value, and it is determined that the pulse width Tb of the current B phase signal is shorter than the determination value, proceeding to Step 123, and the edge of the B phase signal is determined as a noise, and is ignored.

On the other hand, when it is determined, at the above-mentioned Step 122, that the pulse width Tb of the current B phase signal is equal to or greater than the determination value, proceeding to Step 124, and it is determined that the edge of the current B phase signal is a normal one, and is included in the encoder count.

Further, at the above-mentioned Step 125, when it is determined that the pulse width Ta of the current A phase signal is equal to the pulse width Tb of the current B phase signal (i.e., Ta=Tb), proceeding to Step 128, and it is determined that both of the edge of the current A phase signal and the edge of the current B phase signal are a noise, and are ignored.

According to the first embodiment described above, when the A phase signal and the B phase signal are input with a time interval shorter than a preset time (i.e., when the A phase signal and the B phase signal are input almost simultaneously), it is configured that one of the two signals having a shorter interval relative to the previous input signal is determined as a noise. In such manner, a noise signal is accurately detected, thereby preventing the noise signal from being part of the encoder count. Thus, the unmatching of the encoder count, the rotation position of the motor 12, and the power supply phase due to the one-time/temporary noise is prevented, thereby enabling a continuation of the rotation drive of the motor 12, i.e., preventing an abnormality of the motor rotation control.

Second Embodiment

Next, the second embodiment of the present disclosure is described with reference to FIGS. 9 to 12. The same configuration as the first embodiment is not described again in the following, focusing the description only to the difference therefrom.

In the second embodiment, by executing noise determination routines by the microcomputer 41 of the position switching control circuit 42, the noise determination in FIGS. 11 and 12 will be performed in the following manner. That is, every time an output signal of the encoder 46 is input during a rotation of the motor 12, it is determined whether a current input signal is a valid signal by comparing the current input signal with a previous input signal, and, when it is determined that the current input signal is not a valid signal, the current input signal is determined as a noise.

When both of the A phase signal and the B phase signal are normal, the A phase signal and the B phase signal are input in a given order, i.e., an edge of the A phase signal and an edge of the B phase signal are input by turns. Therefore, by comparing the current input signal with the previous input signal, whether the current input signal is a valid signal is determined.

When it is determined that the current input signal is not a valid signal, based on such a noise determination that determines the current input signal as a noise, a noise is detected with sufficient accuracy and such a noise will not be included in the encoder count.

More practically, every time an edge of the A phase signal is input, it is determined whether a previous input is an edge of the B phase signal (i.e., whether the current input signal is a signal in a different phase from the previous input signal), for determining whether an edge of the current A phase signal is a valid signal.

When it is determined that the previous input is not an edge of the B phase signal (i.e., that the previous input is an edge of the A phase signal), indicating that two edges of the A phase signal are successively input, the edge of the current A phase signal is determined as not a valid signal, thereby determining that an edge of the current A phase signal is a noise.

Further, every time an edge of the V phase signal is input, it is determined whether a previous input is an edge of the A phase signal (i.e., whether the current input signal is a signal in a different phase from the previous input signal), for determining whether an edge of the current B phase signal is a valid signal.

When it is determined that the previous input is not an edge of the A phase signal (i.e., that the previous input is an edge of the B phase signal), indicating that two edges of the B phase signal are successively input, the edge of the current B phase signal is determined as not a valid signal, thereby determining that an edge of the current B phase signal is a noise.

Figure 9:
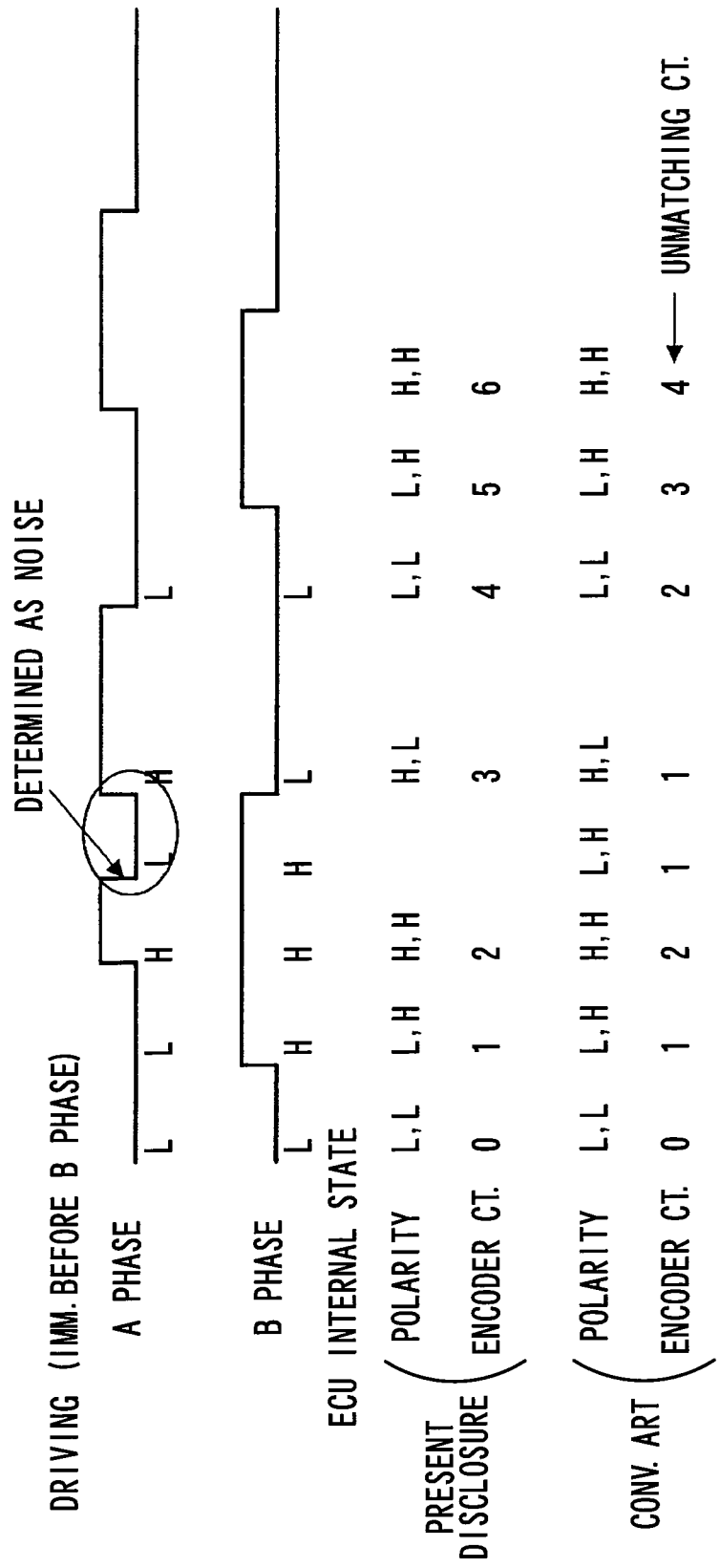
FIG. 9 is a time chart of a noise determination of the present disclosure.

For example, as shown in FIG. 9, when a rising edge of the A phase signal is input next to an input of the falling edge of the A phase signal, indicating that two edges of the A phase signal are successively input, the falling edge of the current A phase signal is determined as a noise, and is ignored (not included in the encoder count). In such a case, the rising edge of the next A phase signal is also ignored.

Figure 10:
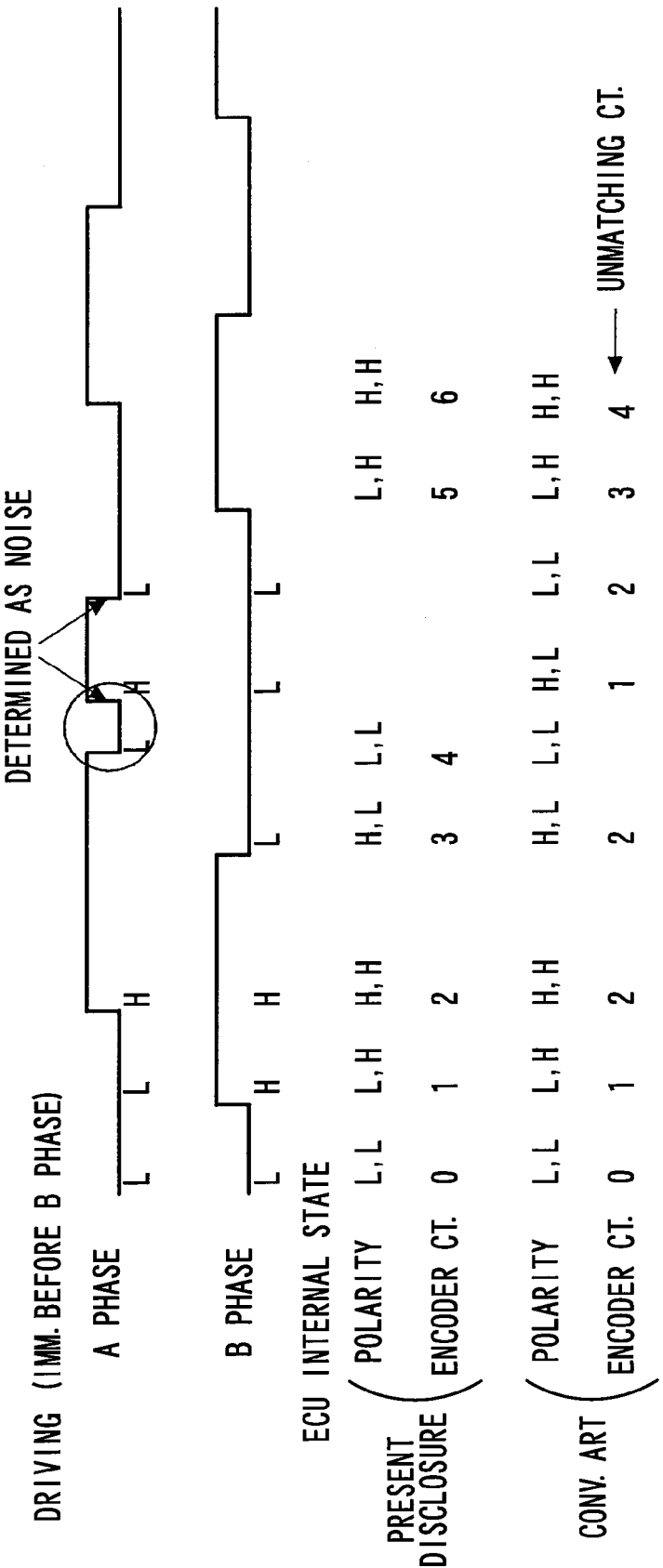
FIG. 10 is a time chart of another noise determination of the present disclosure.

Further, as shown in FIG. 10, when the rising edge of the A phase signal is input next to the falling edge of the A phase signal, indicating that two edges of the A phase signal are successively input, the rising edge of the current A phase signal is determined as a noise, and is ignored.

Further, when the falling edge of the A phase signal is input next to the rising edge of the A phase signal, the falling edge of the A phase signal is also determined as a noise, and is ignored.

In such manner, a failure of the matching (relationship) between the encoder count, the rotation position of the motor 12, and the power supply phase due to the one-time noise is prevented, thereby enabling a continuation of the motor rotation control for driving the motor 12 by serially switching the power supply phase based on the encoder count.

Figure 11:
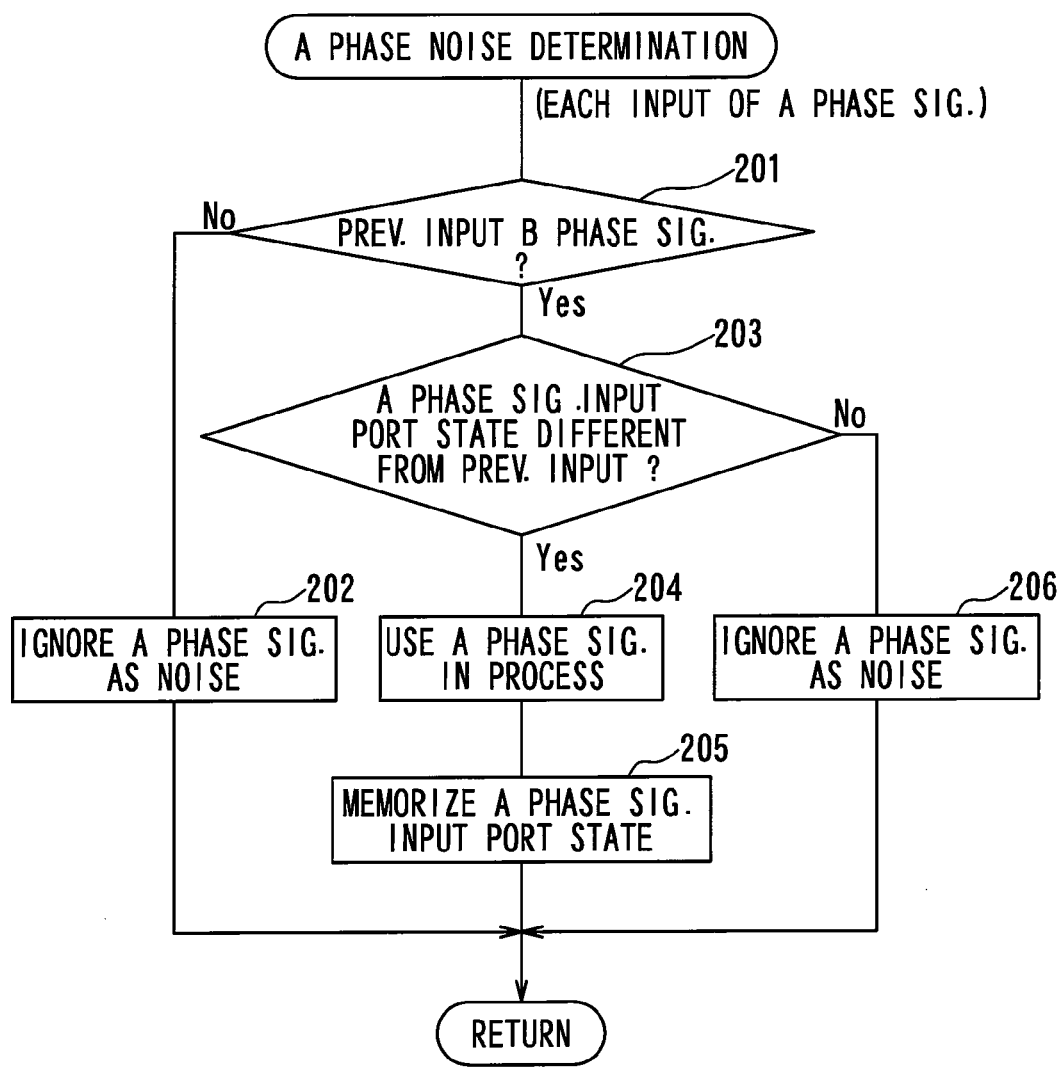
FIG. 11 is a flowchart of processes of an A phase noise determination routine of the present disclosure.
Figure 12:
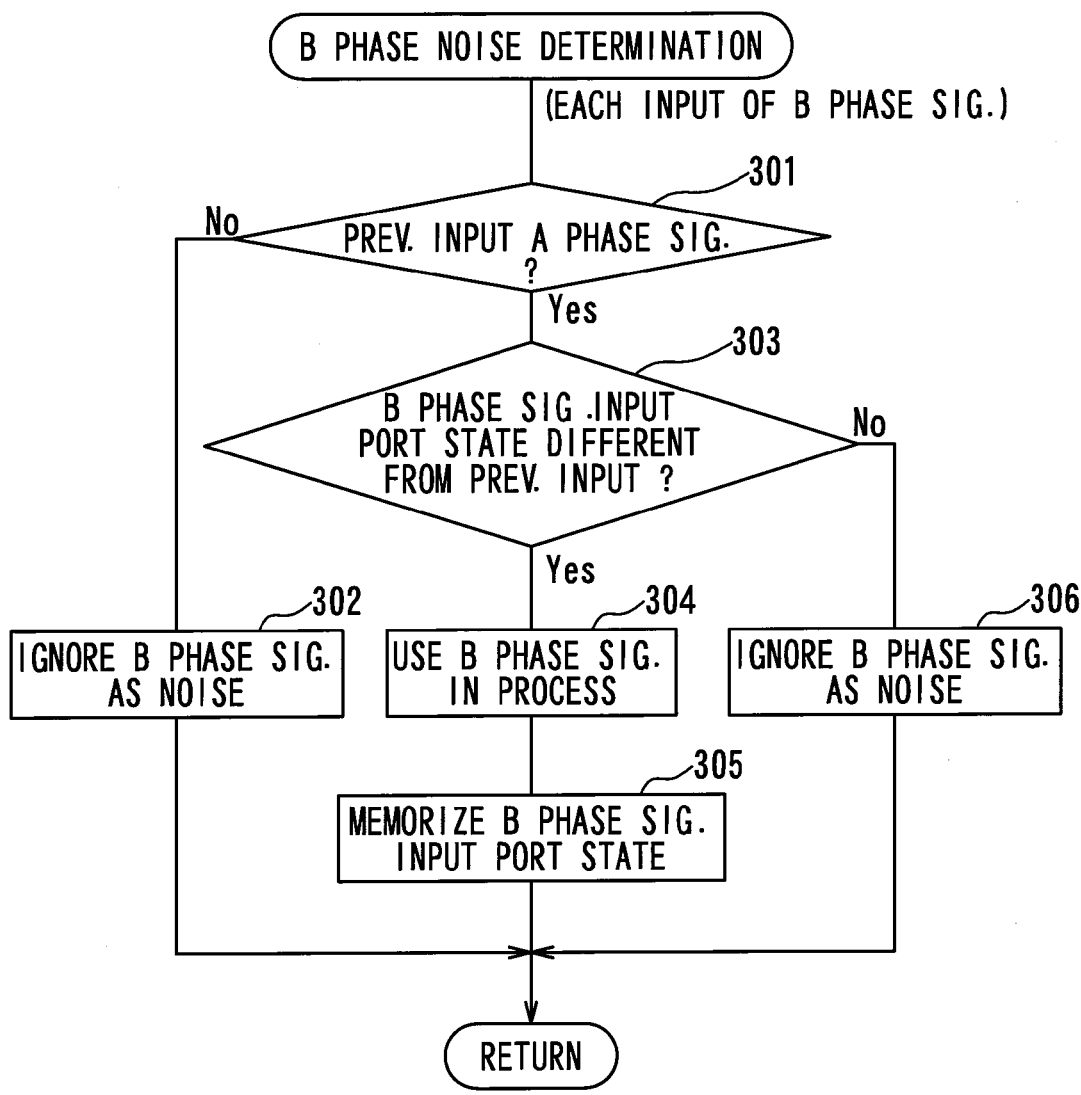
FIG. 12 is a flowchart of processes of a B phase noise determination routine of the present disclosure.

Hereafter, the contents of the noise determination routines of FIGS. 11 and 12 which are executed by the microcomputer 41 of the position switching control circuit 42 are described.

An A phase noise determination routine shown in FIG. 11 is executed by the microcomputer 41, at intervals, i.e., every time an edge (i.e., a rising edge or a falling edge) of the A phase signal is input during the rotation of the motor 12.

When an edge of the A phase signal is input and the present routine is started, at Step 201, by determining whether the previous input is an edge of the B phase signal (i.e., by determining whether the current input signal is a signal in a different phase from the previous input signal or not), for determining whether an edge of the current A phase signal is a valid signal.

When it is determined, at Step 201, that the previous input is not an edge of the B phase signal (i.e., determined as an edge of the A phase signal), indicating that two edges of the A phase signal are successively input, the edge of the current A phase signal is determined as not a valid signal, thereby determining that an edge of the current A phase signal is a noise (i.e., is not included in the encoder count).

On the other hand, when it is determined, at the above-mentioned Step 201, that the previous input is an edge of the B phase signal, proceeding to Step 203, and it is determined whether a state of an input port of the A phase signal of the microcomputer 41 differs from a previous state.

When it is determined, at Step 203, that the state of the input port of the A phase signal differs from the previous state, proceeding to Step 204, and it is determined that an edge of the current A phase signal is a normal one (i.e., an edge is not a noise), and the edge is included in the encoder count. Then, proceeding to Step 205, and the state of the input port of the A phase signal is memorized.

On the other hand, at the above-mentioned Step 203, when it is determined that the state of the input port of the A phase signal is the same as the previous state (i.e., no change is observed), proceeding to Step 206, and the edge of the A phase signal is determined as a noise, and is ignored.

A B phase noise determination routine shown in FIG. 12 is executed by the microcomputer 41, at intervals, i.e., every time an edge (i.e., a rising edge or a falling edge) of the B phase signal is input during the rotation of the motor 12.

When an edge of the B phase signal is input and the present routine is started, at Step 301, by determining whether the previous input is an edge of the A phase signal (i.e., by determining whether is the current input signal is a signal in a different phase from the previous input signal or not), for determining whether an edge of the current B phase signal is a valid signal.

When it is determined, at Step 301, that the previous input is not an edge of the A phase signal (i.e., determined as an edge of the B phase signal), indicating that two edges of the B phase signal are successively input, the edge of the current B phase signal is not a valid signal, and, proceeding to Step 302, and the edge of the current B phase signal is determined as a noise, and is ignored (not included in the encoder count).

On the other hand, when it is determined, at the above-mentioned Step 301, whether the previous input is an edge of the A phase signal, proceeding to Step 303, and it is determined whether a state of an input port of the B phase signal of the microcomputer 41 differs from a previous state.

When it is determined that the state of the input port of the B phase signal differs from the previous state, proceeding to Step 304, and it is determined that an edge of the current B phase signal is a normal one (i.e., an edge is not a noise), and the edge is included in the encoder count. Then, proceeding to Step 305, and the state of the input port of the B phase signal is memorized.

On the other hand, at the above-mentioned Step 303, when it is determined that the state of the input port of the B phase signal is the same as previous state (i.e., no change is observed), proceeding to Step 306, and the edge of the B phase signal is determined as a noise, and is ignored.

In the second embodiment described above, when the edges of the A phase signal are successively input during the rotation of the motor 12, it is determined that the edge of the current A phase signal is not a valid signal, and the edge of the A phase signal is determined as a noise. On the other hand, when the edge of the B phase signal is successively input, it is determined that the edge of the current B phase signal is not a valid signal, and the edge of the B phase signal is determined as a noise. In such manner, a noise is detected with sufficient accuracy and is not included in the encoder count.

Therefore, a failure of the matching relationship between the encoder count, the rotation position of the motor 12, and the power supply phase due to the one-time/temporary noise is prevented, thereby enabling a continuation of the rotation drive of the motor 12, i.e., preventing an abnormality of the motor rotation control.

Third Embodiment

Next, the third embodiment of the present disclosure is described with reference to FIGS. 13 to 16. The same configuration as the first embodiment is not described again in the following, focusing the description only to the difference therefrom.

Figure 14:
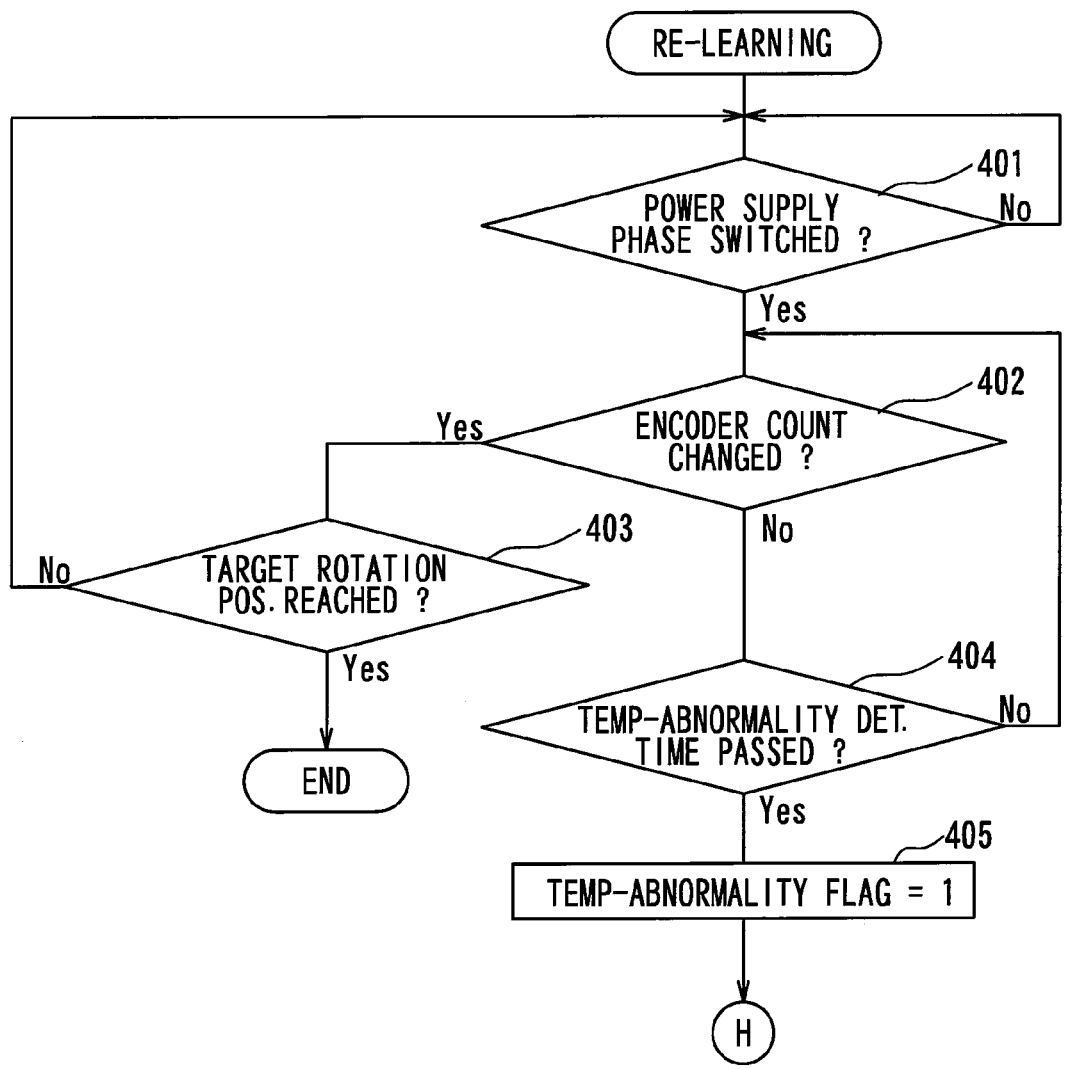
FIG. 14 is a flowchart of processes of a re-learning routine of the present disclosure.
Figure 15:
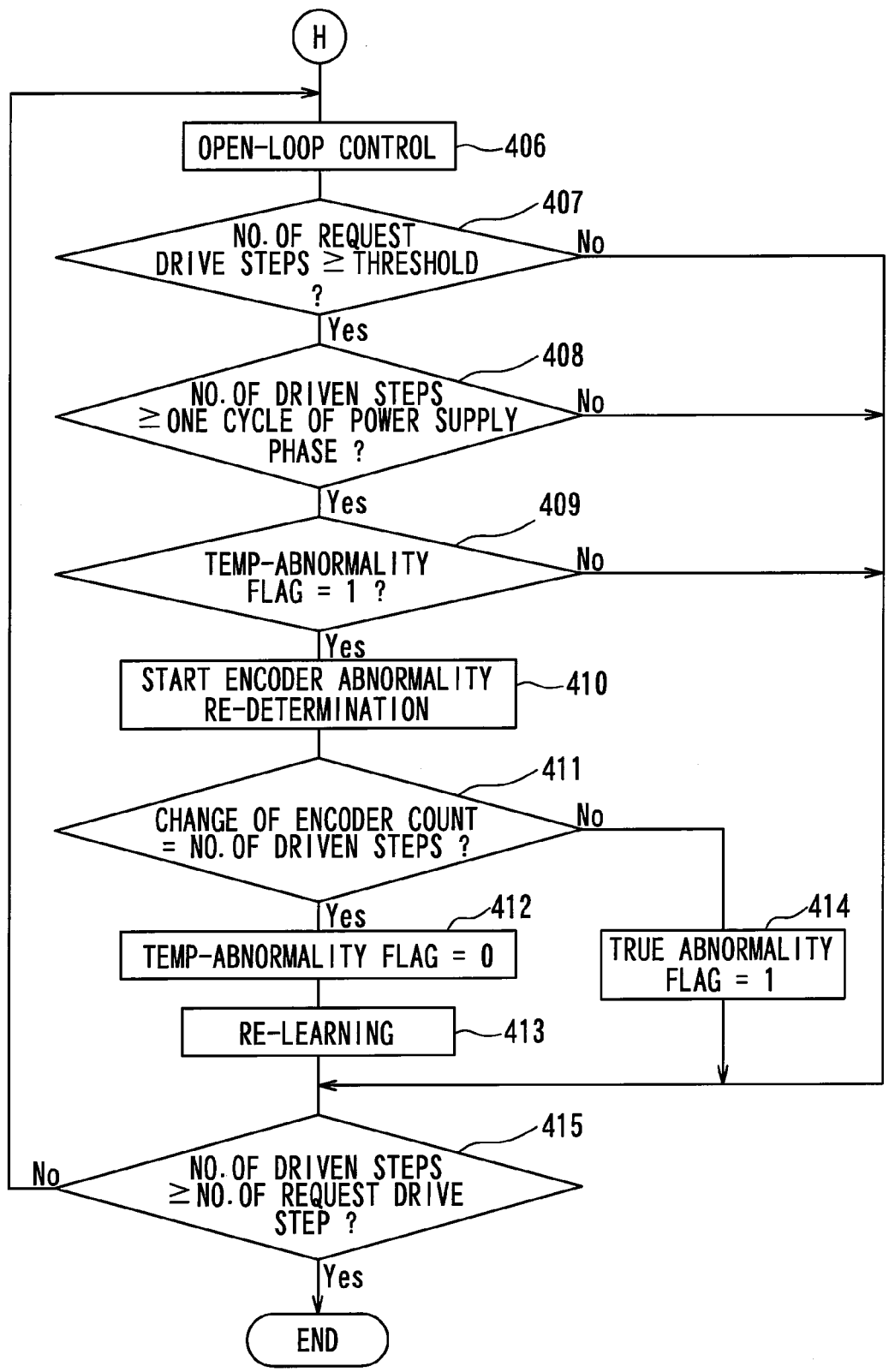
FIG. 15 is a flowchart of processes of the re-learning routine of the present disclosure (continuation from FIG. 14)

In the third embodiment, a re-learning routine is executed as follows by the microcomputer 41 of the position switching control circuit 42 as shown in FIGS. 14 and 15, for performing a re-learning.

When the encoder count does not change normally during the feedback control, the feedback control is switched to the open-loop control, and, during an open-loop control period, in which the motor 12 is rotated to the target rotation position, whether a relationship between the number of switchings of the power supply phase and the amount of change of the encoder count is normal or not is determined. When it is determined that the relationship is normal, a matching relationship between the encoder count and the power supply phase is re-learned (refer to FIG. 16).

Figure 13:
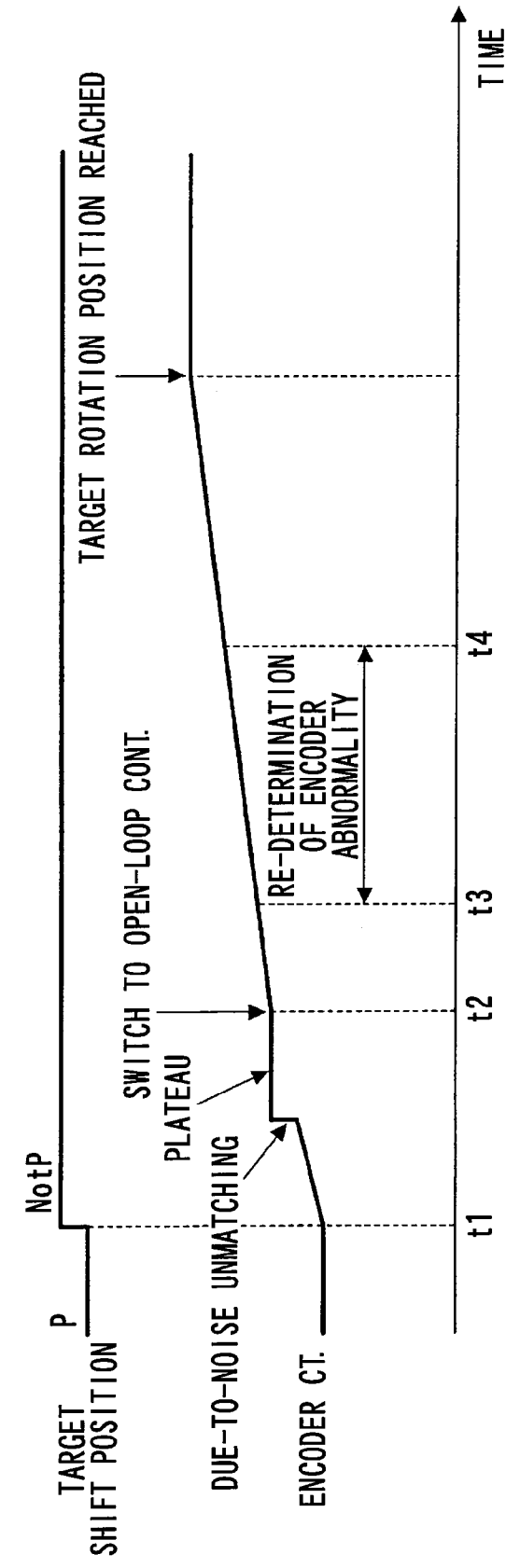
FIG. 13 is a time chart of a re-learning situation of the present disclosure.

As shown in FIG. 13, at time t1 when a target shift position is switched according to a driver's operation of a shift lever, the feedback control is performed. In the feedback control, the motor 12 is driven to rotate to the target rotation position corresponding to the target shift position by the serial switching of the power supply phase based on the encoder count.

During the execution of the feedback control, when it is determined that the encoder count is not changing normally, by a failure of the matching relationship between the encoder count, the rotation position of the motor 12, and the power supply phase which is caused by one-time/temporary noise, at time t2 of such determination, the feedback control is switched to the open-loop control. In the open-loop control, without a feedback of the information about the encoder count, the power supply phase of the motor 12 is serially switched.

Immediately after the start of the open-loop control, the relationship between the rotation position of the motor 12 and the power supply phase is not a matching one. However, by serially switching the power supply phase in the open-loop control, a matching relationship between the rotation position of the motor 12 and one of the multiple phases to be serving as the power supply phase is established, for the rotation drive of the motor 12.

However, while the number of driven steps (i.e., the number of switchings of the power supply phases) after the start of the open-loop control has not reached a preset number, i.e., the number equivalent to one cycle of the power supply phases, the motor 12 may be not yet rotating in a matching relationship between the rotation position thereof and the power supply phase. Therefore, re-determination of an encoder abnormality will not be performed during such period.

Then, at time t3 when the number of driven steps reaches one cycle of the power supply phase, assuming that the motor 12 has started to rotate with the matching relationship between the rotation position thereof and the power supply phase, the re-determination of an encoder abnormality is performed.

In the re-determination of an encoder abnormality, it is determined whether the relationship between the number of switchings of the power supply phase and the amount of change of the encoder count is normal.

Figure 16:
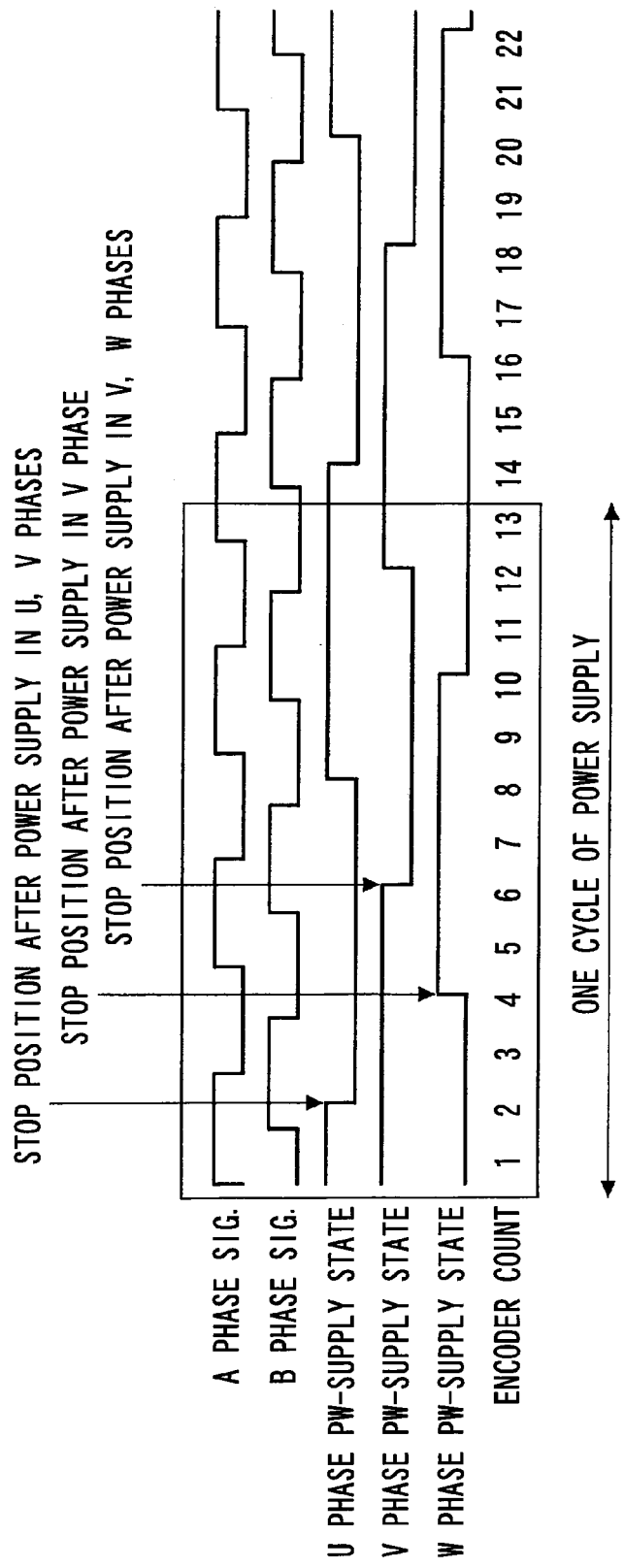
FIG. 16 is an example diagram of relationship between an encoder count and a power supply phase.

When it is determined that the relationship between the number of switchings of the power supply phase and the amount of change of the encoder count is normal, i.e., at time t4, a matching relationship between the encoder count and the power supply phase is re-learned (refer to FIG. 16).

In such manner, the matching relationship between the encoder count and the power supply phase is re-learned during the rotation drive of the motor 12 in the open-loop control to the target rotation position.

Hereafter, the contents of the re-learning routine shown in FIGS. 14 and 15, which is performed by the microcomputer 41 of the position switching control circuit 42 in the third embodiment, are described.

The re-learning routine shown in FIGS. 14 and 15 is performed by the microcomputer 41 during the feedback control.

When the routine is started, it is determined, first at Step 401, whether the power supply phase is switched or not. When it is determined that the power supply phase is switched, proceeding to Step 402, and then it is determined whether the encoder count has changed normally.

When it is determined, at Step 402, that the encoder count has changed normally, proceeding to Step 403, and it is determined whether the rotation position of the motor 12 has reached the target rotation position (i.e., whether the motor 12 has rotated to the target rotation position or not).

When it is determined, at Step 403, that the rotation position of the motor 12 has not reached the target rotation position, the routine returns to the above-mentioned Step 401.

Thereafter, when it is determined, at the above-mentioned Step 403, that the rotation position of the motor 12 has reached the target rotation position, the routine is finished.

On the other hand, when it is determined, at the above-mentioned Step 402, that the encoder count does not change normally, proceeding to Step 404, and it is determined whether a temporary abnormality determination time has passed in an abnormal state, in which the encoder count does not change normally (i.e., it is determined whether an encoder-count no change state has continued for the temporary abnormality determination time).

When it is determined that the temporary abnormality determination time has not passed at Step 404, the routine returns to the above-mentioned Step 402.

Thereafter, at the above-mentioned Step 404, when it is determined that the temporary abnormality determination time has passed, proceeding to Step 405, and an encoder temporary abnormality flag is set to "1."

Then, proceeding to Step 406 of FIG. 15, and the feedback control is switched to the open-loop control. In the open-loop control, the power supply phase of the motor 12 is serially switched without having a feedback of the encoder count information.

Then, proceeding to Step 407, and it is determined whether the number of request drive steps is equal to or greater than a specified value or a threshold. Here, the number of request drive steps is the number of drive steps required in the open-loop control to rotate the motor 12 to the target rotation position (i.e., the required number of switchings of the power supply phase).

If the number of request drive steps is too large, the motor 12 may be rotated to abut to a limit position of a movable range of the shift position switching mechanism 11, which may cause a dis-synchronization. Therefore, for the prevention of such a situation, the number of request drive steps is set up within certain limits which do not rotate the motor 12 to abut against the limit position of the movable range of the shift position switching mechanism 11.

Further, the specified value, or the threshold, is set to an "affordable" number, i.e., a sum total of (i) a number of drive steps required for performing re-determination of an encoder abnormality and (ii) a number of drive steps of one cycle of the power supply phase, or to a "plus-alpha" number that is slightly greater than the "affordable" number.

At Step 407, when it is determined that the number of request drive steps is lower than the specified value, it is determined that the re-determination of an encoder abnormality cannot be performed due to a too-few number of request drive steps, and the routine proceeds to Step 415.

On the other hand, when it is determined that the number of request drive steps is equal to or greater than the specified value at the above-mentioned Step 407, it is determined that the re-determination of an encoder abnormality can be performed, and, progressing to Step 408, it is determined whether the number of driven steps (i.e., the number of drive steps after starting the open-loop control) is equal to or greater than a number corresponding to one cycle of the power supply phase.

At Step 408, when it is determined that the number of driven steps is smaller than a number corresponding to one cycle of the power supply phase, assuming that the motor 12 has not yet started to rotate with the matching relationship between the rotation position thereof and the power supply phase, and the routine proceeds to Step 415.

Thereafter, at the above-mentioned Step 408, when it is determined that the number of driven steps is equal to or greater than a number corresponding to one cycle of the power supply phase, assuming that the motor 12 has already started to rotate with the matching relationship between its rotation position and the power supply phase, and proceeding to Step 409, and it is determined whether an encoder temporary abnormality flag is "1."

At Step 409, when it is determined that the encoder temporary abnormality flag is "1", proceeding to Step 410, and the re-determination of an encoder abnormality is started. In such a case, the number of drive steps (i.e., the number of switchings of the power supply phase) and an amount of change of the encoder count in a preset determination period is computed first.

Then, proceeding to Step 411, and it is determined whether the amount of change of the encoder count in the determination period is equal to a certain number of drive steps that is expected to correspond to the amount of the encoder count in such determination period. By performing such a determination, whether the relationship between the number of drive steps (i.e., the number of switchings of the power supply phase) and the amount of change of the encoder count is normal is determined.

At Step 411, when it is determined that the amount of change of the encoder count in the determination period is equal to the number of corresponding drive steps, it is determined that the relationship between the number of drive steps (i.e., the number of switchings of the power supply phase) and the amount of change of the encoder count is normal, proceeding to Step 412, and an encoder temporary abnormality flag is reset to "0." Then, proceeding to Step 413, a matching relationship between the encoder count and the power supply phase is re-learned.

On the other hand, at the above-mentioned Step 411, when it is determined that the amount of change of the encoder count in the determination period is not equal to the number of corresponding drive steps, it is determined that the relationship between the number of drive steps (i.e., the number of switchings of the power supply phase) and the amount of change of the encoder count is not normal, proceeding to Step 414, and an encoder true abnormality flag is set to "1."

Then, proceeding to Step 415, it is determined whether the driven number of steps has reached the number of request drive steps. When it is determined that the number of driven steps has not reached the number of request drive steps, the routine returns to the above-mentioned Step 407.

When it is determined that the encoder temporary abnormality flag is not "1" (i.e., the encoder temporary abnormality flag is "0") at the above-mentioned Step 409, the routine proceeds to Step 415.

Then, at the above-mentioned Step 415, when it is determined that the number of driven steps has reached the number of request drive steps, it is determined that the motor 12 has rotated to the target rotation position, and the routine is finished.

In the above, after the re-learning a matching relationship between the encoder count and the power supply phase (e.g., after rotating the motor 12 to the target rotation position), a reference position may be re-learned by performing an abutment control.

According to the third embodiment described above, when the encoder count does not change normally during the feedback control, the feedback control is switched to the open-loop control, and, during such a period of rotating the motor 12 to the target rotation position by the open-loop control, it is determined whether the relationship between the number of switchings of the power supply phase and the amount of change of the encoder count is normal.

Then, if it is determined that the relationship between the number of switchings of the power supply phase and the amount of change of the encoder count is normal, a matching relationship between the encoder count and the power supply phase is re-learned.

In such manner, during a period of time of rotating the motor 12 to the target rotation position by the open-loop control, the matching relationship between the encoder count and the power supply phase can be re-learned. Thus, a recovery to the motor rotation control that drives the motor 12 to rotate by serially switching the power supply phase based on the encoder count is enabled, and one-time noise is prevented from failing the normal rotation control of the motor 12.

(Fourth embodiment) Next, the fourth embodiment of the present disclosure is described with reference to FIGS. 17 and 18. The same configuration as the third embodiment is not described again in the following, focusing the description only to the difference therefrom.

In the fourth embodiment, the re-learning is performed in the following manner, i.e., by performing the re-learning routine of FIG. 18 by the microcomputer 41 of the position switching control circuit 42.

When the encoder count does not change normally during the feedback control, the feedback control is switched to the open-loop control, and, during a minute rotation drive period for driving the motor (to stay) within a current shift position after a rotation drive of the motor 12 to the target rotation position by the open-loop control, the controller 41 performs a relationship determination determining whether a relationship between a number of switchings of the power supply phase and an amount of change of the encoder count is normal.

When the relationship determination indicates that the relationship is normal, the controller 41 re-learns a correspondence between the encoder count and the power supply phase.

Figure 17:
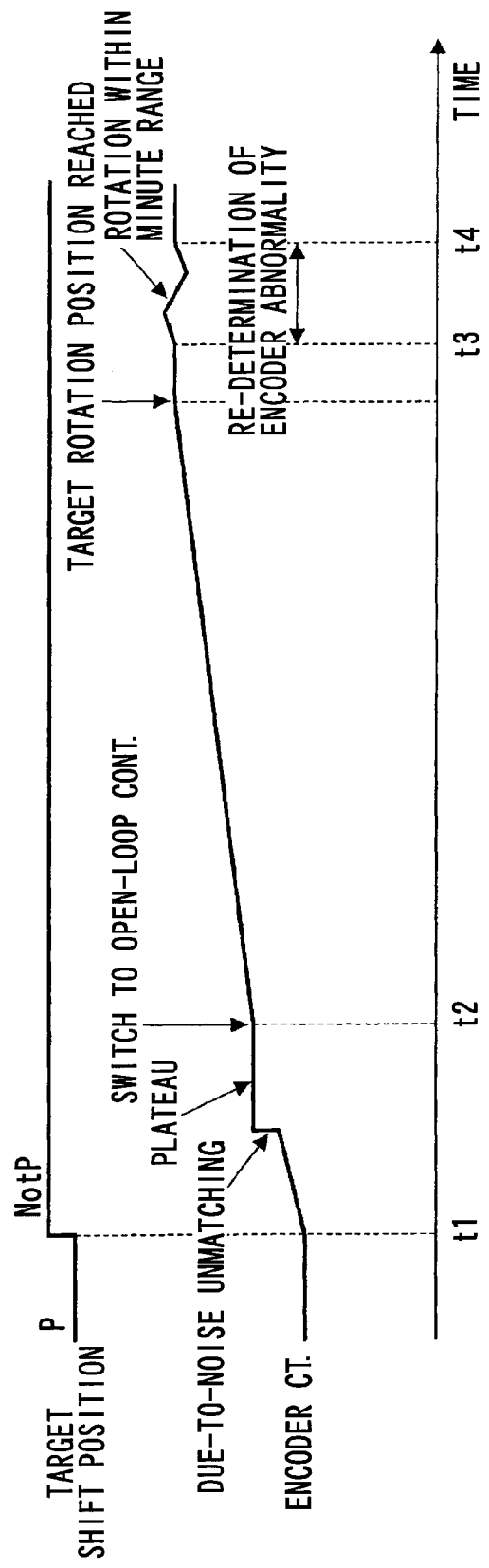
FIG. 17 is a time chart of the re-learning situation of the present disclosure.

More practically, as shown in FIG. 17, at time t1 when a target shift position is switched according to a driver's operation of a shift lever, the feedback control is performed. During the execution of the feedback control, when it is determined that the encoder count is not changing normally, by a failure of the matching relationship between the encoder count, the rotation position of the motor 12, and the power supply phase which is caused by one-time/temporary noise, at time t2 of such determination, the feedback control is switched to the open-loop control.

Immediately after the start of the open-loop control, the relationship between the rotation position of the motor 12 and the power supply phase is not a matching one. However, by serially switching the power supply phase in the open-loop control, a matching relationship between the rotation position of the motor 12 and one of the multiple phases to be serving as the power supply phase is established, for the rotation drive of the motor 12.

After rotating the motor 12 to the target rotation position by the open-loop control, the motor 12 is further rotated by the open-loop control within a minute rotation range in which a current shift position does not change, or is not switched.

The minute rotation range may be, for example, set to a rotation angle that corresponds to one cycle of the power supply phase of the motor 12 (i.e., a rotation angle of the motor 12 corresponding to one round of switchings of the power supply phase), or set to a somewhat larger rotation angle than that.

For example, when the rotation angle corresponding to one cycle of the power supply phase of the motor 12 is 45 degrees and a speed reduction ratio of the deceleration mechanism 26 is 60, a rotation angle of the detent lever 15 (i.e., the manual shaft 13) corresponding to one cycle of the power supply phase of the motor 12 is 0.75 degrees (i.e., 45/60 degrees). At such a small amount of the rotation angle, the shift position will not be switched.

In the fourth embodiment, when rotating the motor 12 within the minute rotation range by the open-loop control, the drive current of the motor 12 is restricted to be below a specified value. The specified value may be, for example, set to be lower than an electric current value that corresponds to a minimum torque for switching the shift position (i.e., lower than a minimum torque required for the engagement part 23a of the detent spring 23 to climb and conquer a dividing convex between the concaves 24 and 25 of the detent lever 15).

During the minute rotation drive period of the motor 12 by the open-loop control, the re-determined of an encoder abnormality is performed.

In the re-determination of an encoder abnormality, it is determined whether the relationship between the number of switchings of the power supply phase and the amount of change of the encoder count is normal.

Then, at time t4 when it is determined that the relationship between the number of switchings of the power supply phase and the amount of change of the encoder count is normal, a matching relationship between the encoder count and the power supply phase is re-learned.

In such manner, after rotating the motor 12 to the target rotation position by the open-loop control (i.e., during a period in which the motor 12 is rotated within the minute rotation range), the matching relationship between the encoder count and the power supply phase is re-learned.

Figure 18:
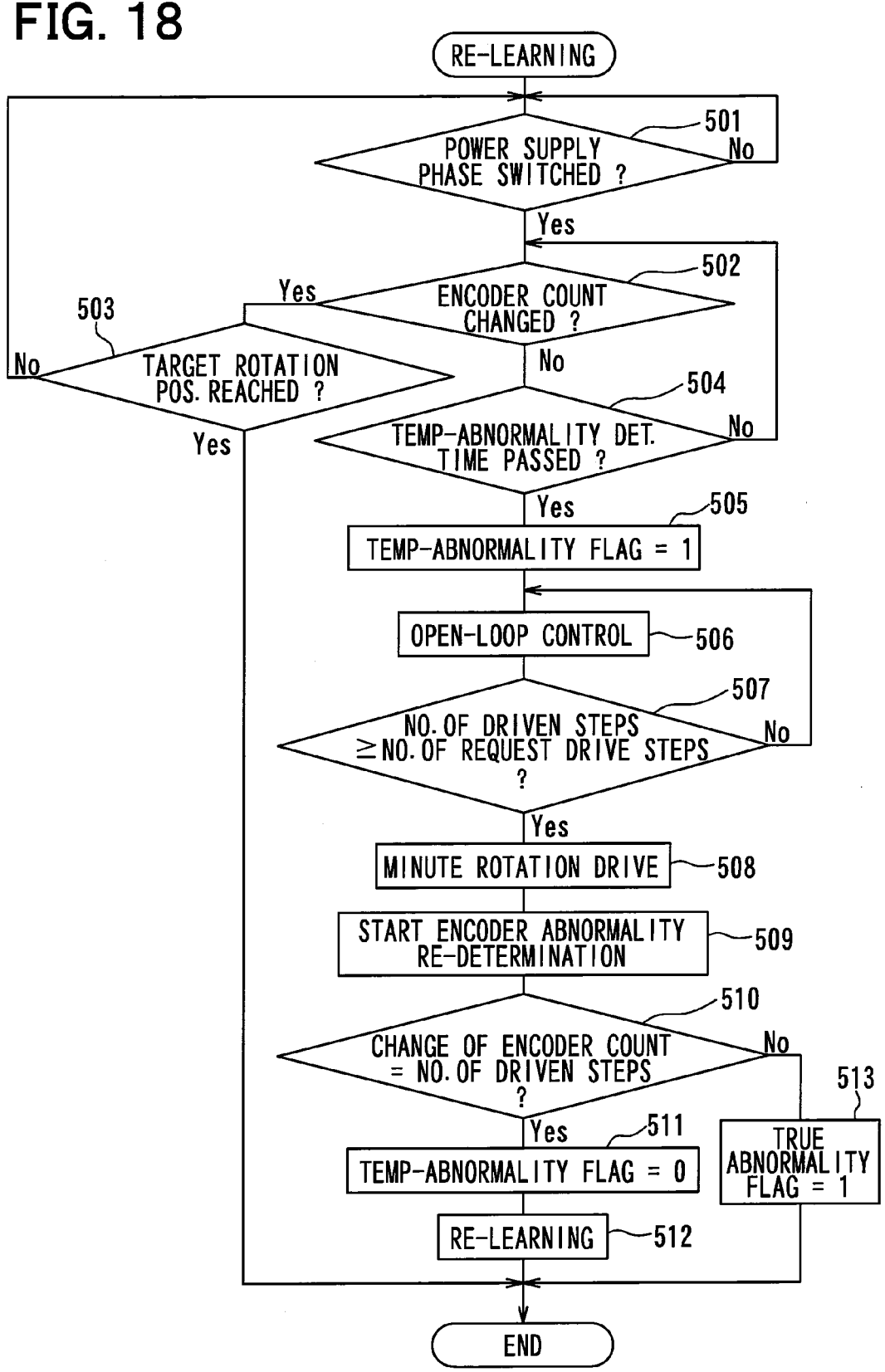
FIG. 18 is a flowchart of processes of the re-learning routine of the present disclosure.

Hereafter, the contents of the re-learning routine of FIG. 18 which is performed by the microcomputer 41 of the position switching control circuit 42 in the fourth embodiment are described.

The re-learning routine shown in FIG. 18 is executed by the microcomputer 41 during the feedback control. When the routine is started, first at Step 501, it is determined whether the power supply phase is switched or not. When it is determined that the power supply phase is switched, proceeding to Step 502, and it is determined whether the encoder count has changed normally.

At Step 502, when it is determined that the encoder count has changed normally, proceeding to Step 503, and it is determined that the rotation position of the motor 12 has reached the target rotation position.

When it is determined that the rotation position of the motor 12 has not reached the target rotation position at Step 503, the routine returns to the above-mentioned Step 501. Thereafter, when it is determined that the rotation position of the motor 12 has reached the target rotation position at the above-mentioned Step 503, the routine is finished.

When it is determined that the encoder count does not change normally at the above-mentioned Step 502, on the other hand, it is determined whether the temporary abnormality determination time has passed in an abnormal state, in which the encoder count does not change normally.

When it is determined that the temporary abnormality determination time has not passed at Step 504, the routine returns to the above-mentioned Step 502. Thereafter, when it is determined that the temporary abnormality determination time has passed at the above-mentioned Step 504, proceeding to Step 505, and an encoder temporary abnormality flag is set to "1."

Then, proceeding to Step 506, and the feedback control is switched to the open-loop control. Then, proceeding to Step 507, and it is determined whether the number of driven steps has reached the number of request drive steps. When it is determined that the number of driven steps has not reached the number of request drive steps, the routine returns to the above-mentioned Step 506.

Thereafter, when it is determined that the number of driven steps has reached the number of request drive steps at the above-mentioned Step 507, it is determined that the motor 12 has rotated to the target rotation position, proceeding to Step 508, and a minute rotation drive is performed.

In the minute rotation drive, the motor 12 is rotated within a minute rotation range in which the shift position will not be switched by the open-loop control. The minute rotation range may be, for example, set to a rotation angle corresponding to one cycle of the power supply phase of the motor 12, or to a somewhat larger rotation angle than that. Further, the drive current of the motor 12 is restricted to be below a specified value in such a minute rotation drive. Such a specified value may be, for example, set to be lower than an electric current value corresponding to the minimum torque for switching the shift position.

Then, proceeding to Step 509, and the re-determination of an encoder abnormality is started. In such a case, the number of drive steps (i.e., the number of switchings of the power supply phase) and an amount of change of the encoder count in a preset determination period is computed first.

Then, proceeding to Step 510, and it is determined whether the amount of change of the encoder count in the determination period is equal to a certain number of drive steps that is expected to correspond to the amount of the encoder count in such determination period. By performing such a determination, whether the relationship between the number of drive steps (i.e., the number of switchings of the power supply phase) and the amount of change of the encoder count is normal is determined.

At Step 510, when it is determined that the amount of change of the encoder count in the determination period is equal to the number of corresponding drive steps, it is determined that the relationship between the number of drive steps (i.e., the number of switchings of the power supply phase) and the amount of change of the encoder count is normal, proceeding to Step 511, and an encoder temporary abnormality flag is reset to "0." Then, proceeding to Step 512, a matching relationship between the encoder count and the power supply phase is re-learned.

On the other hand, at the above-mentioned Step 510, when it is determined that the amount of change of the encoder count in the determination period is not equal to the number of corresponding drive steps, it is determined that the relationship between the number of drive steps (i.e., the number of switchings of the power supply phase) and the amount of change of the encoder count is not normal, proceeding to Step 513, and the encoder true abnormality flag is set to "1."

According to the fourth embodiment described above, when the encoder count does not change normally during the feedback control, When the encoder count does not change normally during the feedback control, the feedback control is switched to the open-loop control, and, during a minute rotation drive period for driving the motor (to stay) within a current shift position after a rotation drive of the motor 12 to the target rotation position by the open-loop control, the controller 41 performs a relationship determination determining whether a relationship between a number of switchings of the power supply phase and an amount of change of the encoder count is normal.

When the relationship determination indicates that the relationship is normal, the controller 41 re-learns a correspondence between the encoder count and the power supply phase.

In such manner, after rotating the motor 12 to the target rotation position by the open-loop control (i.e., during the minute rotation drive period in which the motor is rotated within the minute rotation range), a matching relationship between the encoder count and the power supply phase re-learned. Thus, a recovery to the motor rotation control that drives the motor 12 to rotate by serially switching the power supply phase based on the encoder count is enabled, and one-time noise is prevented from failing the normal rotation control of the motor 12.

Further, when rotating the motor 12 within the minute rotation range by the open-loop control, the drive current of the motor 12 is restricted to be below the specified value in the fourth embodiment. In such manner, when rotating the motor 12 within the minute rotation range by the open-loop control for re-learning a matching relationship between the encoder count and the power supply phase, such a restriction of the drive current of the motor 12 to be below the specified value securely limit the torque of the motor 12 to be lower than the minimum torque for switching the shift position, thereby securely preventing the switching of the shift position.

Although the present disclosure has been fully described in connection with preferred embodiment thereof with reference to the accompanying drawings, it is to be noted that various changes and modifications is apparent to those skilled in the art.

In each of the above-mentioned embodiments, the encoder 46 is implemented as a magnetic type encoder. However, the encoder may be an optical type, or a brush type. Further, the encoder 46 may output not only the A phase signal and the B phase signal, but also a Z phase signal for error correction, or indexing.

Although the switched-reluctance motor (i.e., an SR motor) is used as the motor 12 in each of the above-mentioned embodiments, any synchronous brushless motor may be used as the motor 12 as long as the power supply phase of the motor is serially switched.

Although the present disclosure is applied to the system provided with the shift position switching mechanism which switches two shift positions, between the P position and the Not-P position in each of the above-mentioned embodiments, the present disclosure may be applicable to any system provided with the shift position switching mechanism which is not limited to the two shift position type. For example, the shift position in the switching mechanism may be switched between four positions, i.e., among the P position, the R position, the N position, and the D position. Further, three shift positions or five or more shift positions may also be used in the switching mechanism.

Further, the present disclosure is not applicable to the automatic transmissions (i.e., AT, CVT, DCT, etc.), but also applicable to the shift position switching apparatus for switching the shift positions of the speed reducer in an electric vehicle or the like. Such changes, modifications, and summarized schemes are to be understood as being within the scope of the present disclosure as defined by appended claims.

What is claimed is:

1. A shift-position switching controller comprising:
a shift-position switcher switching shift positions via a drive power from a motor;
an encoder outputting an A phase signal and a B phase signal in synchronization with a rotation of the motor, the A phase signal and the B phase signal being interposed by a preset phase difference; and
a controller controlling a rotation drive of the motor by serially switching a power supply phase of the motor based on a count value of the output signal from the encoder, wherein
when the A phase signal and the B phase signal are input at a time interval that is shorter than a preset length, the A phase signal or the B phase signal that has a shorter time interval compared to a previous input signal is determined by the controller as being noise.

2. A shift-position switching controller comprising:
a shift-position switcher switching shift positions via a drive power from a motor;
an encoder outputting an A phase signal and a B phase signal in synchronization with a rotation of the motor, the A phase signal and the B phase signal having a preset phase difference set therebetween; and
a controller controlling a rotation drive of the motor by serially switching a power supply phase of the motor based on a count value of the output signal from the encoder, wherein
when an output signal from the encoder is input to the controller during the rotation of the motor, the controller determines whether a current input signal is valid based on a comparison of the current input signal with a previous input signal, and
when the controller determines that the current input signal is not valid, the controller determines that the current input signal is noise.

3. A shift-position switching controller comprising:
a shift-position switcher switching shift positions via a drive power from a motor;
an encoder outputting a pulse signal in synchronization with a rotation of the motor; and
a controller performing a feedback control of a rotation drive of the motor to drive the motor to a target rotation position corresponding to a target shift-position, by serially switching a power supply phase of the motor based on an encoder count representing a count value of the output signals from the encoder, wherein
the controller switches to an open-loop control in which the power supply phase is serially switched without receiving feedback regarding the encoder count when the encoder count changes abnormally during the feedback control,
the controller performs a relationship determination that determines whether a relationship between a number of switchings of the power supply phase and an amount of change of the encoder count is normal during a rotation drive period during which the motor is driven to the target rotation position by the open-loop control, and
the controller re-learns a correspondence between the encoder count and the power supply phase when the relationship determination indicates that the relationship is normal.

4. A shift-position switching controller comprising:
a shift-position switcher switching shift positions via a drive power from a motor;
an encoder outputting a pulse signal in synchronization with a rotation of the motor; and
a controller performing a feedback control of a rotation drive of the motor to drive the motor to a target rotation position corresponding to a target shift-position, by serially switching a power supply phase of the motor based on an encoder count representing a count value of the output signal from the encoder, wherein
the controller switches to an open-loop control in which the power supply phase is serially switched without receiving feedback regarding the encoder count when the encoder count does not change normally during the feedback control,
the controller performs a relationship determination that determines whether a relationship between a number of switchings of the power supply phase and an amount of change of the encoder count is normal during a minute rotation drive period during which the motor is driven to stay within a current shift-position, the minute rotation drive period being a period after the rotation drive for driving the motor to the target rotation position by the open-loop control, and the controller re-learns a correspondence between the encoder count and the power supply phase when the relationship determination indicates that the relationship is normal.

5. The shift-position switching controller of claim 4, wherein the controller limits a drive electric current of the motor to be equal to or less than a preset value when performing the open-loop control for driving the motor to stay within the current shift-position during the minute rotation drive period.

* * * * *